(12) United States Patent
Fukuda et al.

(10) Patent No.: US 6,982,980 B2
(45) Date of Patent: Jan. 3, 2006

(54) NETWORK MANAGEMENT APPARATUS

(75) Inventors: Kenichi Fukuda, Kawasaki (JP);
Takao Ogura, Chiba (JP); Makoto Minoura, Kawasaki (JP); Hitoshi Ueno, Kawasaki (JP); Kohei Iseda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 909 days.

(21) Appl. No.: 09/996,049

(22) Filed: Nov. 28, 2001

(65) Prior Publication Data

US 2002/0067729 A1    Jun. 6, 2002

(30) Foreign Application Priority Data

Nov. 30, 2000  (JP) .............................. 2000-364871

(51) Int. Cl.
*H04L 12/28* (2006.01)

(52) U.S. Cl. .............................. 370/395.21; 370/395.3; 370/468

(58) Field of Classification Search ........... 370/395.21, 370/468, 401, 353, 354, 355, 356, 254, 229, 370/232, 235, 471; 709/220, 223
See application file for complete search history.

(56) References Cited

U.S. PATENT DOCUMENTS 6,563,794 B1 * 5/2003 Takashima et al. ......... 370/236
6,847,613 B2 * 1/2005 Mimura et al. ............ 370/235

FOREIGN PATENT DOCUMENTS

| JP | 09-162870 | 6/1997 |
| JP | 10-084349 | 3/1998 |

OTHER PUBLICATIONS

Kim et al, An integrated network management system: the design for AIN and B- ISDN, Apr. 15-19, 1996, IEEE, vol.: 2 , pp. 604-607 vol. 2.*
Chadha et al, PECAN: Policy-enabled configuration across networks, Jun. 4-6, 2003, IEEE, pp. 52-62.*

* cited by examiner

*Primary Examiner*—Chi Pham
*Assistant Examiner*—Alexander O. Boakye
(74) *Attorney, Agent, or Firm*—Katten Muchin Rosenman LLP

(57) ABSTRACT

In a network management apparatus which manages a network composed of network elements installing different communication technologies such as an ATM, an MPLS, and a Diff-Serv, a QoS guarantee path route candidate retriever retrieves a route enabling a predetermined QoS to be guaranteed or a route enabling the predetermined QoS to be guaranteed by being assigned with the flow identifier from among routes between a source and a destination network elements based on network configuration information, QoS guarantee capability information, the flow identifier assignment capability information, and a QoS guarantee path establishing portion performs a QoS guarantee setting and a flow identifier assignment setting to the network elements on the retrieved route.

11 Claims, 18 Drawing Sheets

FIG.3A NETWORK CONFIGURATION INFORMATION 11

| NETWORK ELEMENT ID | SAP | LINK ID |
|---|---|---|
| ROUTER 20_1 | SAP40_1 | LINK 30_1, LINK 30_2, LINK 30_3 |
| ROUTER 20_2 | (NONE) | LINK 30_2, LINK 30_4, |
| ROUTER 20_3 | SAP40_2 | LINK 30_4, LINK 30_5, LINK 30_6 |
| ATM SWITCH 20_4 | (NONE) | LINK 30_3, LINK 30_5 |

FIG.3B QoS GURANTEE CAPABILITY INFORMATION 12

| NETWORK ELEMENT ID | QoS GURANTEE CAPABILITY <IDENTIFIER PATTERN C1_pattern, QUALITY PATTERN Q1_pattern> |
|---|---|
| ROUTER 20_1 | <DESTINATION IP ADDRESS, FIXED BAND GUARANTEE>, <DSCP, PRIORITY CONTROL> |
| ROUTER 20_2 | <DSCP, PRIORITY CONTROL> |
| ROUTER 20_3 | <DESTINATION IP ADDRESS, FIXED BAND GUARANTEE>, <DSCP, PRIORITY CONTROL> |
| ATM SWITCH 20_4 | <VPI/VCI, FIXED BAND GUARANTEE> |

FIG.3C FLOW IDENTIFIER ASSIGNMENT CAPABILITY INFORMATION 13

| NETWORK ELEMENT ID | FLOW IDENTIFIER ASSIGNMENT CAPABILITY <FLOW IDENTIFIER, OTHER FLOW IDENTIFIER> |
|---|---|
| ROUTER 20_1 | <DESTINATION IP ADDRESS, VPI/VCI> |
| ROUTER 20_2 | (NONE) |
| ROUTER 20_3 | <DESTINATION IP ADDRESS, VPI/VCI> |
| ATM SWITCH 20_4 | (NONE) |

FIG.3D NETWORK ELEMENT SETTING INFORMATION 14

| NETWORK ELEMENT ID | QoS GARANTEE SETTING INFORMATION <ENTRANCE LINK ID, EXIT LINK ID, <FLOW IDENTIFIER INFORMATION>, <QoS INFORMATION >> | FLOW IDENTIFIER ASSIGNMENT SETTING INFORMATION <ENTRANCE LINK ID, EXIT LINK ID, <FLOW IDENTIFIER INFORMATION>, <OTHER FLOW IDENTIFIER'S INFORMATION>> |
|---|---|---|
| ROUTER 20_1 | <LINK 30_1, LINK 30_3, <DESTINATION IP ADDRESS, 10.10.10.1>, <FIXED BAND GUARANTEE, 10 Mbps>> | <LINK 30_1, LINK 30_3, <DESTINATION IP ADDRESS, 10.10.10.1>, <VPI/VCI, ANY>> |
| ATM SWITCH 20_4 | <LINK 30_3, LINK 30_5, <VPI/VCI, ANY>, <FIXED BAND GUARANTEE, 10 Mbps>> | (NONE) |
| ROUTER 20_3 | <LINK 30_5, LINK 30_6, <DESTINATION IP ADDRESS, 10.10.10.1>, <FIXED BAND GUARANTEE, 10 Mbps>> | (NONE) |

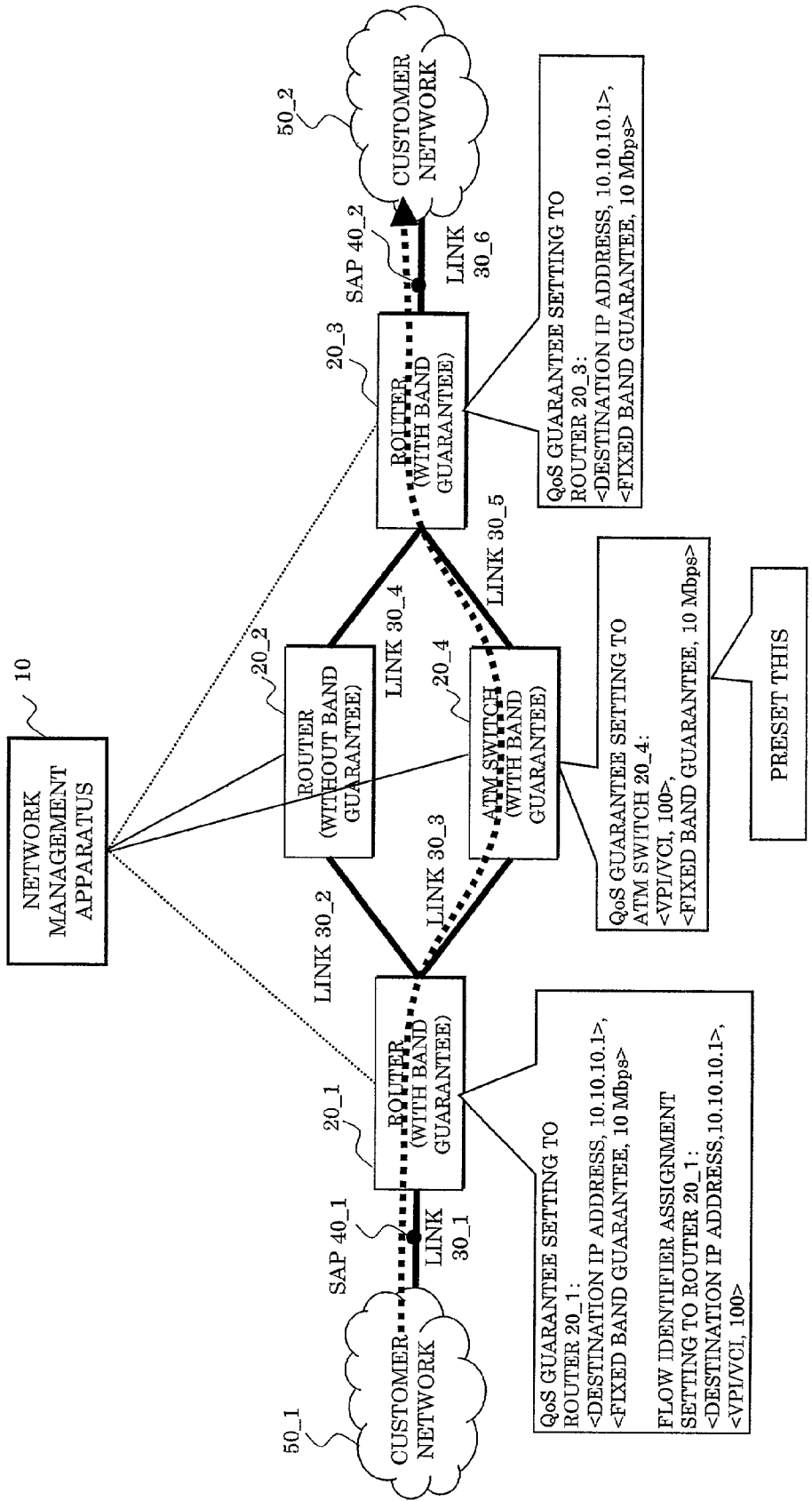

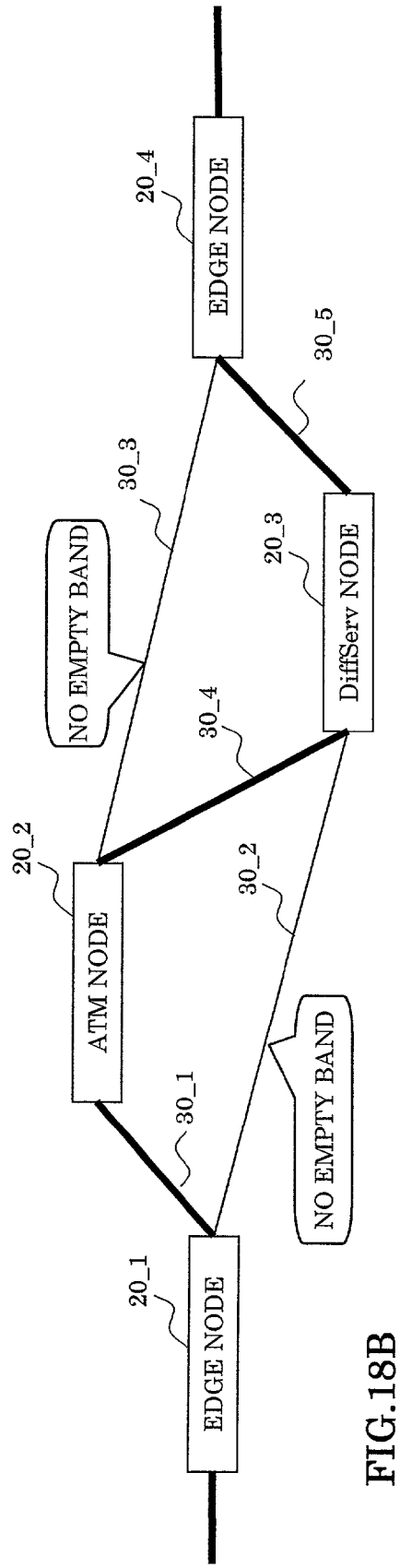

NETWORK MANAGEMENT APPARATUS

BACKGROUND OF THE INVENTION

1. Field of the Invention

The present invention relates to a network management apparatus, and in particular to a network management apparatus which manages a network composed of network elements implementing or installing different communication technologies such as an ATM (Asynchronous Transfer Mode), an MPLS (Multi-Protocol Label Switching), and a Diff-Serv (Differentiated Services).

Such a network management apparatus, when a Quality of Service (hereinafter, abbreviated as QoS) is requested in the network, is required to select a network element to be guaranteed with the QoS and to perform a QoS guarantee setting in each selected network element.

2. Description of the Related Art

FIG. 18A shows a general network composed of network elements respectively installing different communication technologies. In this network, edge nodes (network elements) 20_1 and 20_4 are connected through an ATM node 20_2 or a DiffServ node 20_3. Between the edge nodes 20_1 and 20_4, there are following three routes; (1) link 30_1→ATM node 20_2→link 30_3, (2) link 30_1→ATM node 20_2→link 30_4→DiffServ node 20_3→link 30_5, and (3) link 30_2→DiffServ node 20_3→link 30_5.

In the absence of an empty band in the links 30_2 and 30_3, the route (2) (shown by thick lines) through the edge nodes 20_1 and 20_4 connected in cascade is the only route.

FIG. 18B shows a general network example in which the nodes (network elements) 20_1 and 20_2, whose communication technologies such as a QoS guarantee and a flow identifier assignment capability are different from each other, are connected with the link 30_1 and the node 20_3 which is different from the node 20_2 is connected to the node 20_2 with the link 30_2.

Cases 1–4 respectively show that the nodes 20_1 and 20_3 employ an IP-ONU (Optical Network Unit), a Diff-Serv router, an LSR (Label Switch Router), or a router, and the node 20_2 employs an OLT (Optical Line Terminal), a DiffServ core router, a core LSR, or an ATM switch.

Thus, a general network is composed of network elements which mount thereon various communication technologies.

Hereinafter, the QoS guarantee in such a network will be described.

In a prior art IP network, as in the Internet, the QoS guarantee of the communication could not be performed, so that a best-effort type communication has been performed.

Also, in an IntServ of the IETF (Internet Engineering Task Force), a resource at the time of a communication has been secured by using a signaling technology RSVP (Resource ReSerVation Protocol) for a band guarantee path establishment, so that the QoS has been guaranteed.

Also, in a DiffServ technology of the IETF, the QoS guarantee per DSCP (DiffServ Code Point) has been set in the network element for setting a band guarantee.

However, only the network element which mounts thereon a single QoS guarantee mechanism such as the IntServ or the DiffServ has been able to guarantee the QoS, which limits the QoS guarantee.

Also, in an MPLS of the IETF, a mechanism of autonomously establishing a path has been prescribed so that an edge router assigns an identifier to an IP flow and a core router transfers an IP packet according to the identifier.

However, a mechanism of exchanging information on the QoS guarantee setting has not been prescribed.

Also, while the QoS setting is possible in case the path is explicitly established manually or the like, the retrieval of a route and the preparation of QoS guarantee setting contents are required to be performed manually.

In such a prior art network management apparatus, there have been problems that the calculation of a QoS guarantee route and the preparation of the QoS guarantee setting contents can not be automated, requiring much process time for the QoS control by end to end in the network composed of a plurality of sub-networks whose communication technologies such as a QoS guarantee and a flow identifier assignment capability are different from each other.

SUMMARY OF THE INVENTION

It is accordingly an object of the present invention to provide a network management apparatus which manages a network composed of network elements which mount thereon communication technologies whose patterns such as a QoS guarantee and a flow identifier are different, which retrieves a QoS guarantee route passing through a plurality of network elements or sub-networks at a high speed, and which guarantees a QoS of the network element on the route.

In order to achieve above-mentioned object, a network management apparatus of the present invention according to claim 1 comprises: a storage for storing network configuration information indicating a connection state of a plurality of network elements, QoS guarantee capability information indicating a QoS guarantee capability of the network elements, and flow identifier assignment capability information indicating a flow identifier assignable by the network elements; a QoS guarantee path route candidate retriever for retrieving a route enabling a predetermined QoS to be guaranteed or a route enabling the predetermined QoS to be guaranteed by being newly assigned with the flow identifier from among routes between a source and a destination network elements based on the network configuration information, the QoS guarantee capability information, and the flow identifier assignment capability information, and for preparing QoS guarantee setting information and predetermined flow identifier assignment setting information provided to the network elements on the retrieved route; and a QoS guarantee path establishing portion for performing the QoS guarantee setting and the flow identifier assignment setting to the network elements.

FIG. 1 shows a principle of a network management apparatus 10 according to the present invention. Network elements 20_1–20_N (hereinafter, occasionally represented by a reference numeral 20) connected to the network management apparatus 10 are general network elements which mount thereon various communication technologies.

A QoS guarantee path route candidate retriever 16 retrieves, based on network configuration information indicating a connection state of the network elements 20, QoS guarantee capability information indicating a QoS guarantee capability of the network elements 20, and flow identifier assignment capability information indicating a flow identifier assignable by the network elements 20 which are all stored in a storage 18, a route enabling a predetermined QoS to be guaranteed from routes between a predetermined source network element 20 and a destination network element 20 as well as a route enabling the predetermined QoS to be guaranteed by being assigned with the flow identifier, and prepares setting information for guaranteeing the QoS and for assigning the flow identifier to the network elements 20 on the route.

Namely, the QoS guarantee path route candidate retriever 16 retrieves not only the route enabling the predetermined QoS to be guaranteed but also the route enabling the QoS to be guaranteed by the route available between the network elements 20 at the preceding and the subsequent stages by setting the flow identifiers of the network element 20 at the preceding or the subsequent stage on the route, and prepares the setting information.

A QoS guarantee path establishing portion 17 performs a QoS guarantee setting and a flow identifier assignment setting to the network elements 20.

Thus, even in the network composed of the network elements 20 which mount thereon communication technologies whose patterns of the QoS guarantee, the flow identifier, and the like are different from each other, it becomes possible to retrieve the QoS guarantee route at a high speed and to establish the QoS guarantee route of the network element 20 on the route.

It is to be noted that an operator terminal 70 shown in FIG. 1 serves to provide a QoS guarantee request prepared by a customer and an operator to the network management apparatus 10. A QoS guarantee request accepting analyzer 15 serves to analyze the QoS guarantee request to be provided to the QoS guarantee path route candidate retriever 16, which will be described later.

Also, in the present invention according to claim 2, the storage may further include network element setting information of the network elements composed of the QoS guarantee setting information and the predetermined flow identifier assignment setting information prepared by the QoS guarantee path route candidate retriever; and the QoS guarantee path establishing portion may perform, based on the network element setting information, the QoS guarantee setting and the flow identifier assignment setting of the network elements.

Namely, the storage 18 stores the QoS guarantee setting information and the flow identifier assignment setting information for setting the network elements on the route detected by the QoS guarantee path route candidate retriever 16 as network element setting information 14.

The QoS guarantee path establishing portion 17 may perform the QoS guarantee setting and the flow identifier assignment setting of the network element 20 based on the network element setting information 14.

Also, in the present invention according to claim 3, the QoS guarantee path establishing portion may store a flow identifier value determined by the network element to which either the QoS guarantee setting or the flow identifier assignment setting has been performed, and may make the flow identifier value an identifier value set in other network elements.

Namely, when the QoS guarantee path establishing portion performs the QoS guarantee setting and the flow identifier setting to the network elements in the presence of the network element 20 which determines a flow identifier value, the network management apparatus 10 can not predetermine the flow identifier value of the related network element 20.

Therefore, the flow identifier value determined by the network element 20 is stored and made a flow identifier value of the related network element.

Thus, it becomes possible to select the network element which autonomously determines the flow identifier value as an element on the QoS guarantee route.

Also, in the present invention according to claim 4, upon failing to establish a QoS guarantee path of a network resource securing type, the QoS guarantee path establishing portion may establish a next QoS guarantee path retrieved by the QoS guarantee path route candidate retriever.

Namely, when the QoS guarantee path can not be established by the failure of securing a network resource, the QoS guarantee path establishing portion establishes a next QoS guarantee path retrieved by the QoS guarantee path route candidate retriever 16.

Thus, the QoS guarantee path establishing portion 17 can secure the QoS guarantee path of the network resource securing type from a plurality of QoS guarantee routes.

Also, in the present invention according to claim 5, in presence of a plurality of routes enabling the predetermined QoS to be guaranteed, the QoS guarantee path establishing portion may select a single route from among the routes according to a preliminarily designated selection method.

Namely, in the presence of a plurality of routes enabling the predetermined QoS to be guaranteed, the QoS guarantee path establishing portion 17 selects a single route according to a preliminarily designated selection method, e.g. a selection method preliminarily designated by a network provider.

Thus, the condition of designating the QoS guarantee path can be further set.

Also, in the present invention according to claim 6, the QoS guarantee capability information may further indicate a QoS guarantee capability of a sub-network composed of a plurality of network elements.

Namely, QoS guarantee capability information 12 can store QoS guarantee capability information of a sub-network. For example, the QoS guarantee capability information 12 stores the QoS guarantee capability indicating the QoS guarantee capability of the sub-network composed of a plurality of network elements mutually connected and having the same QoS guarantee capability.

The QoS guarantee path route candidate retriever 16 retrieves the QoS guarantee route based on the QoS guarantee capability information of the sub-network.

Thus, the QoS guarantee path route candidate retriever 16 can retrieve the QoS guarantee route at a higher speed.

Also, in the present invention according to claim 7, the QoS guarantee capability information may further indicate a QoS guarantee capability of a sub-network composed of a plurality of network elements whose treatable flow identifiers are coincident with each other.

Namely, the QoS guarantee capability information of the sub-network indicates the QoS guarantee capability of a sub-network composed of a plurality of network elements whose treatable flow identifiers are coincident with each other. Thus, the QoS guarantee path route candidate retriever 16 can retrieve the QoS guarantee route at a higher speed.

Also, in the present invention according to claim 8, the sub-network may comprise a network of other carriers. Thus, it becomes possible to retrieve the QoS guarantee route including the network of other carriers.

Also, in the present invention according to claim 9, the QoS guarantee path route candidate retriever may retrieve, as a route enabling the predetermined QoS to be guaranteed by being assigned with the flow identifier, a route having no network element which deletes the flow identifier between a network element assigning the flow identifier and a network element guaranteeing a QoS based on the flow identifier.

Namely, the QoS guarantee path route candidate retriever 16 checks that there is no network element 20 which deletes the flow identifier between the preceding and the subsequent stages of the network elements 20 even if the network element 20 which guarantees the QoS based on the flow identifier is not directly connected to the subsequent stage of the network element 20 which assigns the flow identifier, thereby retrieving the QoS guarantee route.

Thus, the network element 20 can determine the route based on the flow identifier assigned by the preceding network element 20.

Also, in the present invention according to claim 10, the QoS guarantee path route candidate retriever may specify, as a route enabling the predetermined QoS to be guaranteed by being assigned with the flow identifier, a network element which deletes the flow identifier per classification of a flow identifier, and may retrieve a route to a network element having a capability to assign the deleted flow identifier.

Namely, the QoS guarantee path route candidate retriever 16 specifies the network element 20 which deletes the flow identifier per classification of a flow identifier, and retrieves the network element having a capability to assign the flow identifier deleted at the network element 20 on the route at the subsequent stage of the network 20.

Based on this retrieving result, the QoS guarantee path establishing portion 17 sets assigning the deleted flow identifier to the network element 20 on the route at the subsequent stage.

Thus, it becomes possible to establish the route including the network element 20 whose flow identifier is deleted as the QoS guarantee route.

Furthermore, in the present invention according to claim 11, the QoS guarantee path establishing portion may establish one or more paths having a preliminarily guaranteed QoS to a network element, and may store QoS guarantee setting information and flow identifiers of the paths, thereby selecting a route enabling the QoS to be guaranteed, based on the QoS guarantee setting information, from among the paths when the predetermined QoS guarantee is requested, and setting another network element so that the flow identifier of the path is used.

Namely, the QoS guarantee path establishing portion 17 establishes paths having preliminarily guaranteed QoS's, and then stores the QoS guarantee setting information and the flow identifier of the paths.

When receiving an establishing request of the predetermined QoS guarantee path, the QoS guarantee path establishing portion 17 selects and establishes a path which satisfies the requested QoS from among the paths established based on the QoS guarantee setting information so that the flow identifier may be used in another network element 20.

Thus, it becomes possible to retrieve the route enabling the QoS to be guaranteed at a high speed.

BRIEF DESCRIPTION OF THE DRAWINGS

FIGS. 3A–3D are diagrams showing information examples held by a network management apparatus according to the present invention in an embodiment (1);

FIG. 17 is a block diagram showing an arrangement of a management object network in an embodiment (4) of a network management apparatus according to the present invention; and FIGS. 18A and 18B are block diagrams showing an arrangement of a management object network of a general network management apparatus.

Throughout the figures, like reference numerals indicate like or corresponding components.

DESCRIPTION OF THE EMBODIMENTS

Figure 2:
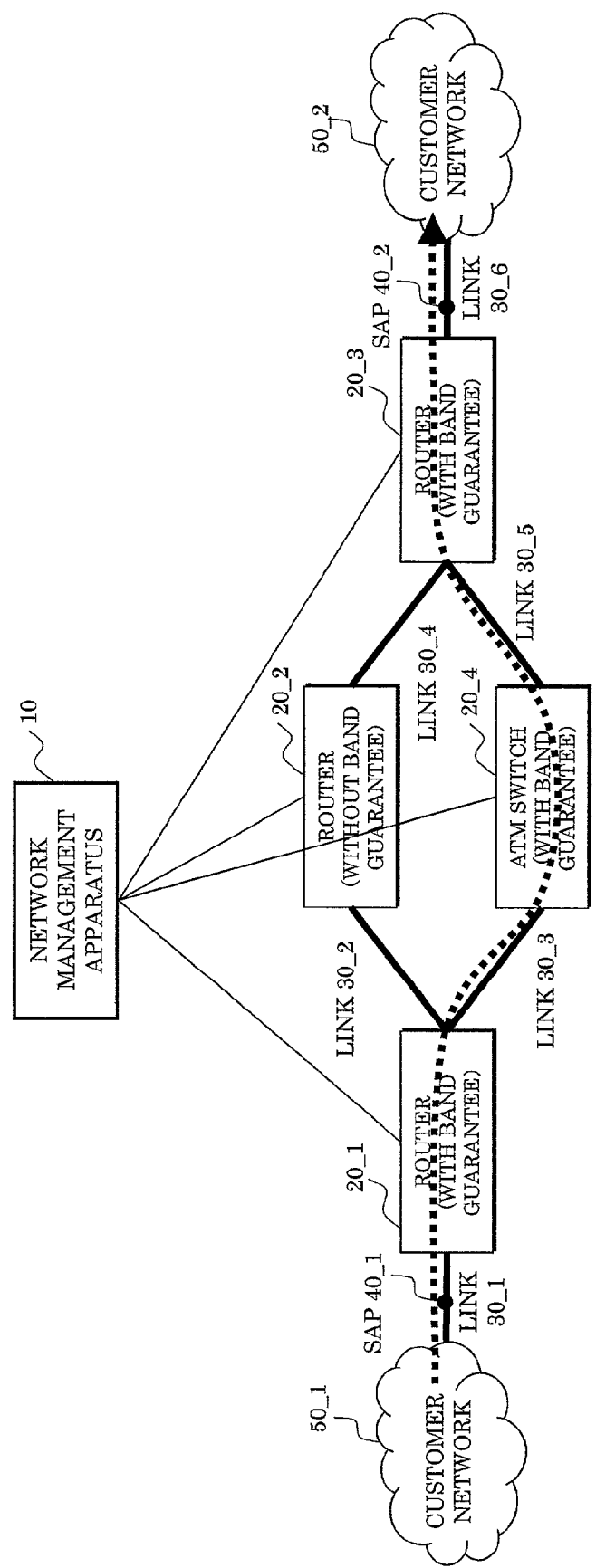
FIG. 2 is a block diagram showing an arrangement of a management object network in an embodiment (1) of a network management apparatus according to the present invention.

An embodiment (1) of the network management apparatus 10 according to the present invention will be described with a network shown in FIG. 2 being made a management object. In FIG. 2, a management object network is a network between customer networks 50_1 and 50_2, and is composed of routers 20_1–20_3 and an ATM switch 20_4 which are network elements. These network elements 20 are connected to the network management apparatus 10.

On links 30_1 and 30_6 which respectively connect the management object network and the customer networks 50_1 and 50_2, Service Access Points (hereinafter abbreviated as SAP's) 40_1 and 40_2 are set.

As for the route connecting these SAP's 40_1 and 40_2, there are a route which passes through the router 20_1, a link 30_2, the router 20_2, a link 30_4, and the router 20_3, and a route which passes through a link 30_3, the ATM switch 20_4, and a link 30_5 instead of the link 30_2, the router 20_2, and the link 30_4.

Figure 1:
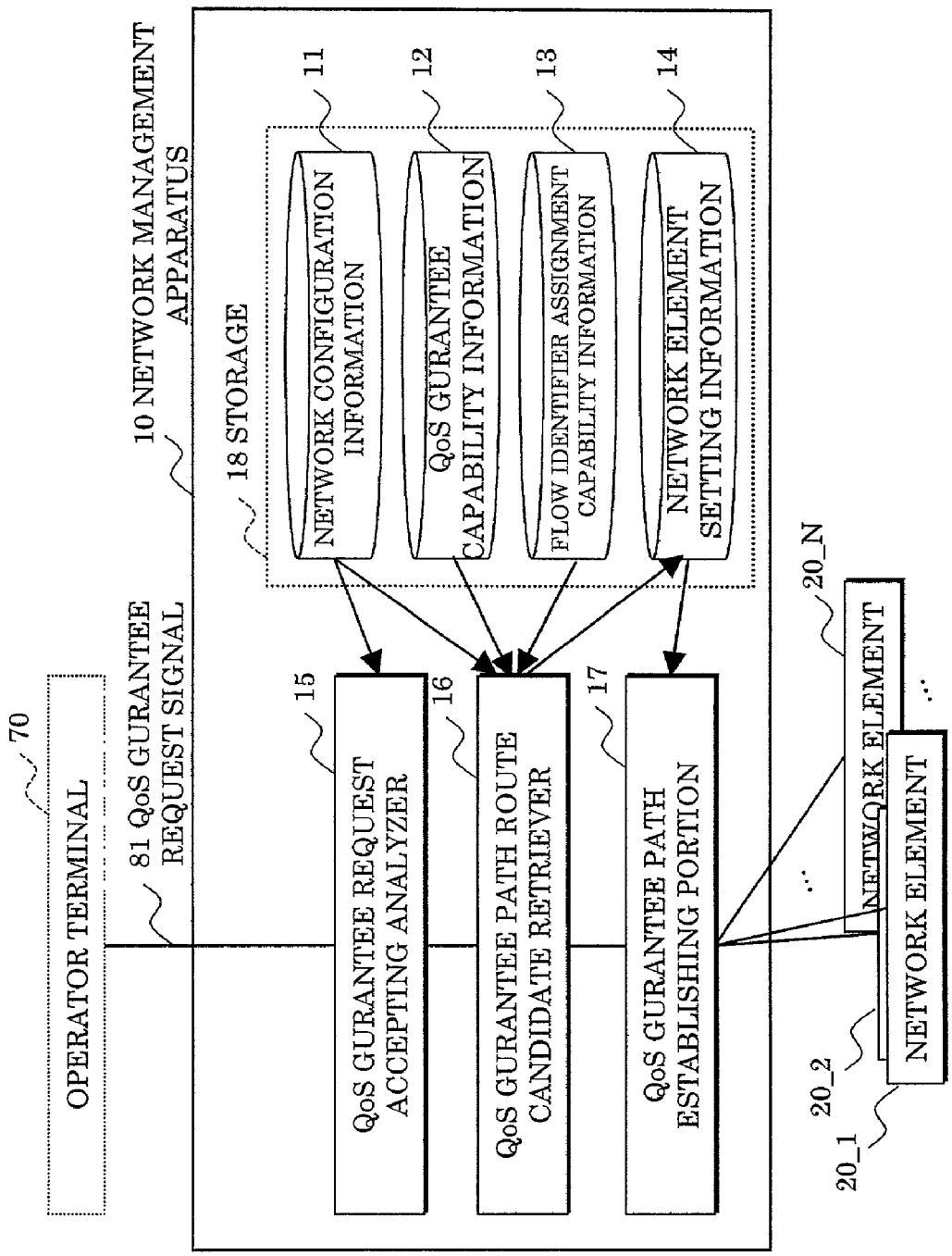
FIG. 1 is a block diagram showing a schematic arrangement of a network management apparatus according to the present invention.

As shown in FIG. 1, the network management apparatus 10 stores the network configuration information 11, the QoS guarantee capability information 12, the flow identifier assignment capability information 13, and the network element setting information 14 in the storage 18. The examples of the information 11–14 corresponding to the management object network shown in FIG. 2 are respectively shown in FIGS. 3A–3D.

The network configuration information 11 of FIG. 3A shows a configuration of the management object network, which is composed of an identifier (hereinafter abbreviated as ID) of the network element, the SAP, and the ID of the link connected to the network element 20 corresponding to the network element ID. In case the network element 20 is the router 20_1 in FIG. 2 for example, the SAP is the SAP 40_1, and the link ID's are the links 30_1–30_3' ID.

The SAP's and the link ID's of the routers 20_2, 20_3, and the ATM switch 20_4 are the same as the case of the router 20_1. However, the SAP's of the router 20_2 and the ATM switch 20_4 are represented by "none" since they are not connected to the links 30_1 and 30_6 on which the SAP's 40_1 and 40_2 are respectively set.

The QoS guarantee capability information 12 of FIG. 3B shows a QoS guarantee capability of the network elements, which is composed of the network element ID and the QoS guarantee capability. The QoS guarantee capability is represented by the combination of <identifier pattern C1_pattern, quality pattern Q1_pattern>.

In case the QoS guarantee capability information of the network element 20 is e.g. <destination IP address, fixed band guarantee>, <destination IP address, minimum band guarantee>, and <DSCP, fixed band guarantee>, it is indicated that the network element 20 has a capability of identifying a flow by the destination IP address and of guaranteeing the fixed band or the minimum band, and a capability of identifying the flow by the DSCP and of guaranteeing the fixed band.

The routers 20_1 and 20_3 shown in FIG. 2 have a capability of identifying the flow by the identifier pattern C1_pattern="destination IP address" and of guaranteeing the fixed band, and have a capability of identifying the flow by the identifier pattern C1_pattern="DSCP" and of guaranteeing a priority control.

Similarly, the router 20_2 has a capability of identifying the flow by the identifier pattern C1_pattern="DSCP" and of guaranteeing the priority control, and the ATM switch 20_4 has a capability of identifying the flow by the identifier pattern C1_pattern="VPI/VCI" and of guaranteeing the fixed band.

Accordingly, as shown in FIG. 2, since the routers 20_1, 20_3, and the ATM switch 20_4 can guarantee the band, they are represented as "with band guarantee", while since the router 20_2 is represented as "without band guarantee" because it can not guarantee the band.

The flow identifier assignment capability information 13 of FIG. 3C shows a capability of assigning the flow identifier of the network elements 20, which is composed of the network element ID and a flow identifier assignment capability represented by <flow identifier, other flow identifiers>. This <flow identifier, other flow identifiers> indicates the combination of recognizable and assignable flow identifiers.

The flow identifier assignment capability is represented by e.g. (1) <destination IP address, VPI/VCI>, (2) <destination IP address, DSCP>, and the like.

(1) <destination IP address, VPI/VCI> indicates that the network element 20 has a capability of identifying the flow by the destination IP address and of newly assigning VPI/VCI (Virtual Path Identifier/Virtual Channel Identifier) to the flow.

(2) <destination IP address, DSCP> indicates that the network element 20 has a capability of identifying the flow by the destination IP address and of newly assigning DSCP to the flow.

For example, the routers 20_1 and 20_3 shown in FIG. 2 can identify the flow by "the destination IP address" and assign the other flow identifier "VPI/VCI" to the flow. Neither the router 20_2 nor the ATM switch 20_4 has a capability of assigning another identifier.

The network element setting information 14 of FIG. 3D indicates setting information to be set in the network elements on the route, which is composed of QoS guarantee setting information and flow identifier assignment setting information. The QoS guarantee setting information is composed of an entrance link ID, an exit link ID, flow identifier information, and QoS information.

The flow identifier assignment setting information is composed of the entrance link ID, the exit link ID, the flow identifier information, and another flow identifier's information.

It is to be noted that some identifier values of the flow identifier information are "ANY" in the router 20_1 and the ATM switch 20_4 in FIG. 3D, which indicates that the network management system can not predetermine the flow identifier value since the network element autonomously determines the flow identifier value.

Upon establishing a path, the flow identifier value (="ANY") obtained as a result of the QoS guarantee setting to the ATM switch 20_4 will be set to another flow identifier value of the flow identifier assignment setting information in the router 20_1.

Hereinafter, the operation will be described that the network management apparatus 10 retrieves and establishes the route enabling the requested QoS to be guaranteed on the management object network shown in FIG. 2 based on a QoS guarantee request signal 81 of a customer inputted from the operator terminal 70 shown in FIG. 1.

(1) QoS Guarantee Request Signal 81 from Operator Terminal 70

The QoS guarantee request signal 81 is described as a quality discriminating request for a specific IP flow. Specifically, it is represented by the combination of the SAP, IP flow identifier information C1, and contents of service quality guarantee Q1. The IP flow identifier information C1 is represented by the combination of an identifier pattern C1_pattern and an identifier value C1_value, and the contents of service quality guarantee Q1 are represented by the combination of a quality pattern Q1_pattern and a quality value Q1_value.

As an example of the identifier pattern C1_pattern, the destination address, the DSCP, a protocol number, and the like can be cited. As an example of the quality pattern Q1_pattern, a fixed band guarantee, a minimum band guarantee, a delay guarantee, a delay fluctuation guarantee, and the like can be cited.

In FIG. 1, the operator terminal 70 requests, by the QoS guarantee request signal 81, the network management apparatus 10 to transfer a flow of the destination address="10.10.10.1" inputted from the SAP 40_1 to the SAP 40_2 with the contents of service quality guarantee (fixed band guarantee="10 Mbps"). The QoS guarantee request signal 81 at this time as follows:

QoS guarantee request signal 81 (SAP: SAP 40_1, SAP 40_2;

IP flow identifier information C1: (identifier pattern C1_pattern: destination address), (identifier value C1_value: 10.10.10.1);

Contents of service quality guarantee Q1: (quality pattern Q1_pattern: fixed band guarantee), (quality value Q1_value: 10 Mbps))

(2) Operation Procedure Example of QoS Guarantee Request Accepting Analyzer 15

Figure 4:
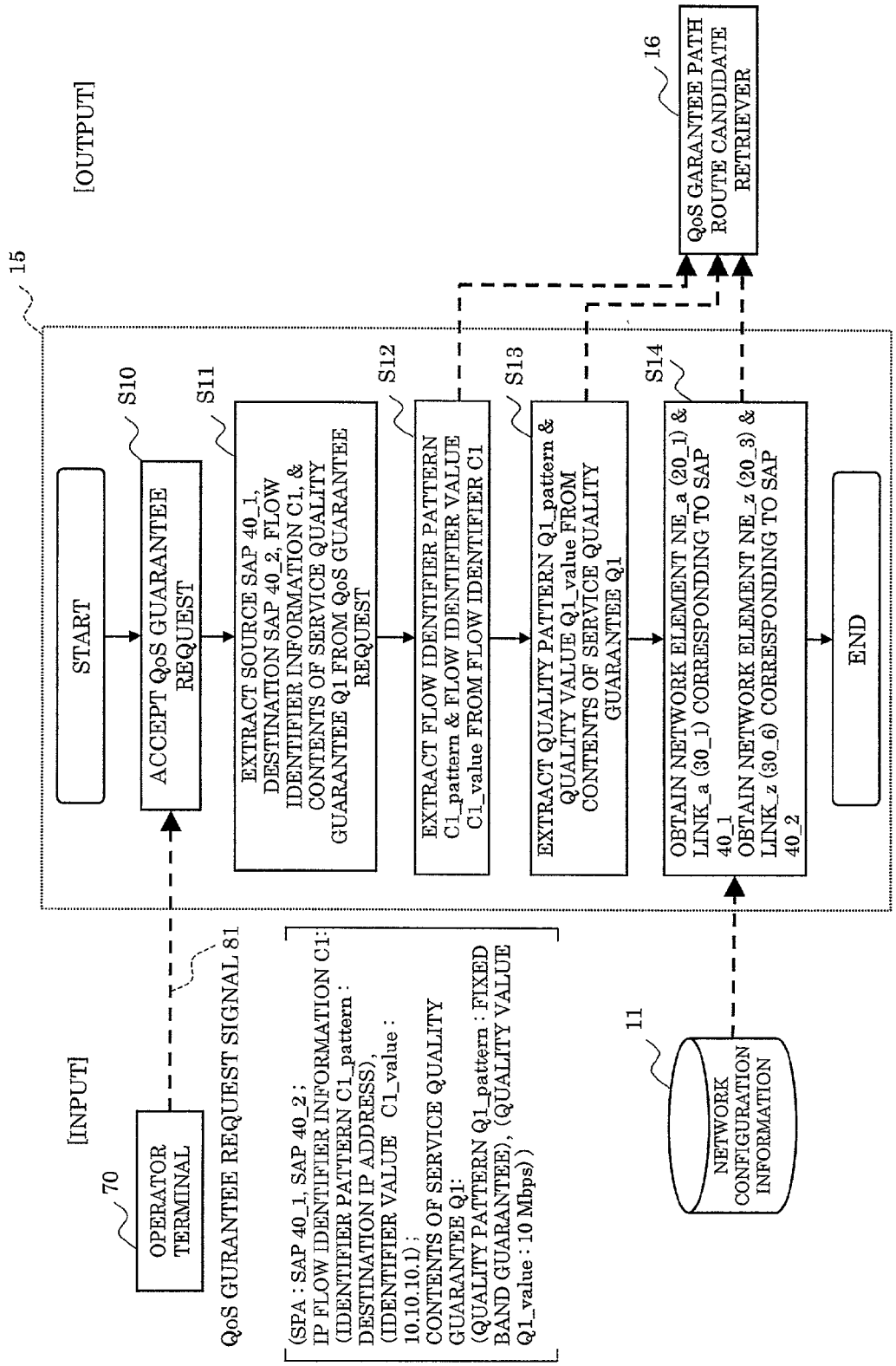
FIG. 4 is a flow chart showing an operation procedure of a QoS guarantee request accepting analyzer in an embodiment (1) of a network management apparatus according to the present invention.

FIG. 4 shows an operation procedure example of the QoS guarantee request accepting analyzer 15. The accepting analyzer 15 analyzes the received QoS guarantee request, extracts components, and makes the SAP correspond to or associated with the link ID. The process operation of the accepting analyzer 15 will be described.

Step S10: The QoS guarantee request signal 81 is accepted from the operator terminal 70.

Step S11: The SAP's 40_1 and 40_2, the flow identifier information C1, and the contents of service quality guarantee Q1 are extracted from QoS guarantee request signal 81.

Step S12: The identifier pattern C1_pattern and the identifier value C1_value are extracted from the flow identifier information C1 to be provided to the QoS guarantee path route candidate retriever 16.

Step S13: The quality pattern Q1_pattern and the quality value Q1_value are extracted from the contents of service quality guarantee Q1 to be provided to the retriever 16.

Step S14: Network elements NE_a (20_1), NE_z (20_3), links Link_a (30_1), and Link_z (30_6) respectively corresponding to the SAP's 40_1 and 40_2 are obtained referring to the network configuration information 11 to be provided to the retriever 16.

It is to be noted that the numerals within the parentheses indicate those of a specific network element 20 and a specific link 30 in the network corresponding to FIG. 2. Hereinafter, the same will apply to the followings.

Thus, the accepting analyzer 15 provides the information (identifier pattern C1_pattern="destination address", identifier value C1_value="10.10.10.1", quality pattern Q1_pattern="fixed band guarantee", quality value Q1_value="10 Mbps", network elements NE_a (20_1), NE_z (20_3), Link_a (30_1), and Link_z (30_6)) to retriever 16.

It is to be noted that the retriever 16 is not always required to receive the above-mentioned information through the terminal 70 and the accepting analyzer 15. The retriever 16 may directly receive the information from the terminal 70 in the form recognizable by itself, or may read the stored information.

(3) Schematic Operation Procedure Example of QoS Guarantee Path Route Candidate Retriever 16

Figure 5:
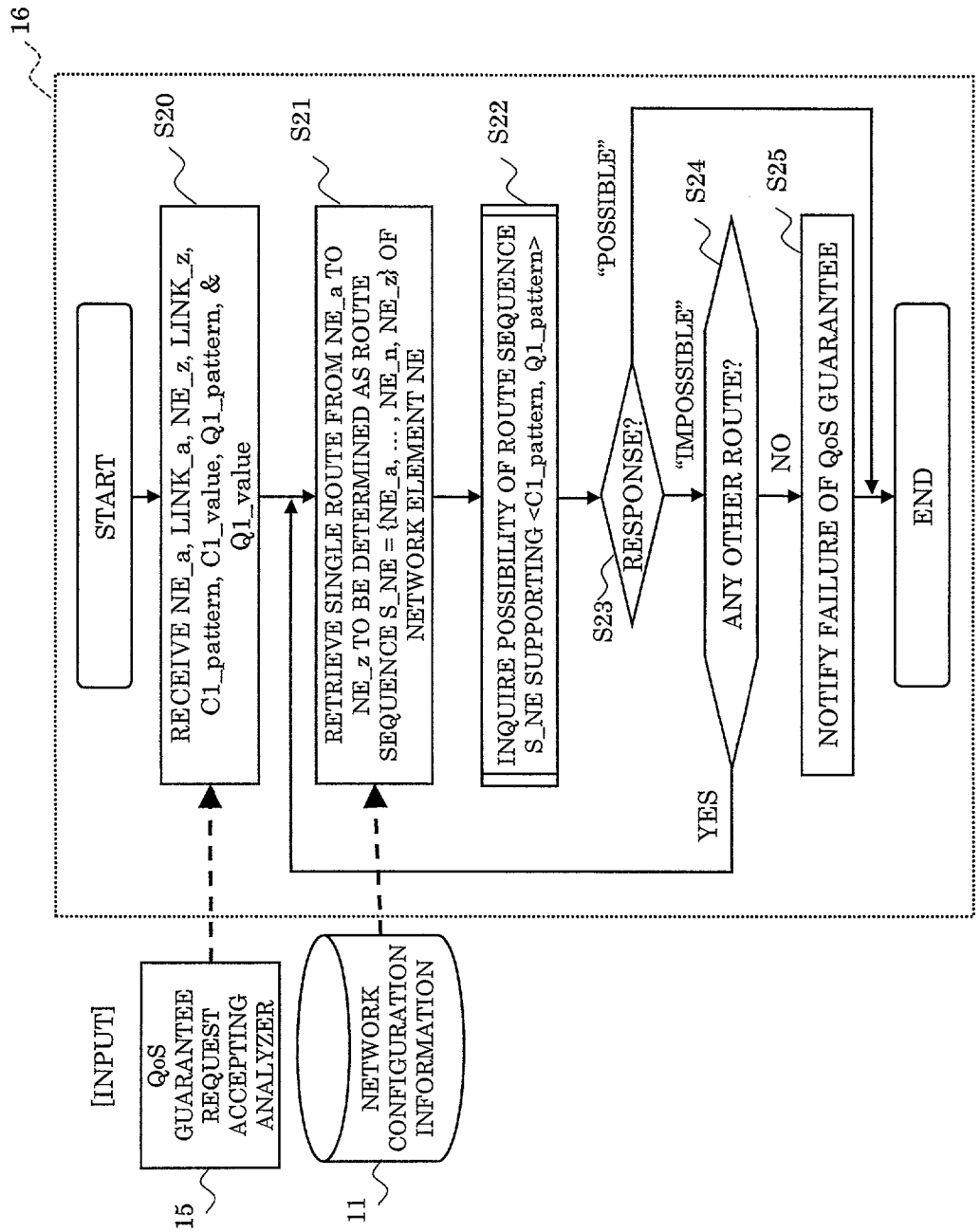
FIG. 5 is a flow chart showing an operation procedure example (No.1) of a QoS guarantee path route candidate retriever in a network management apparatus according to the present invention.
Figure 6:
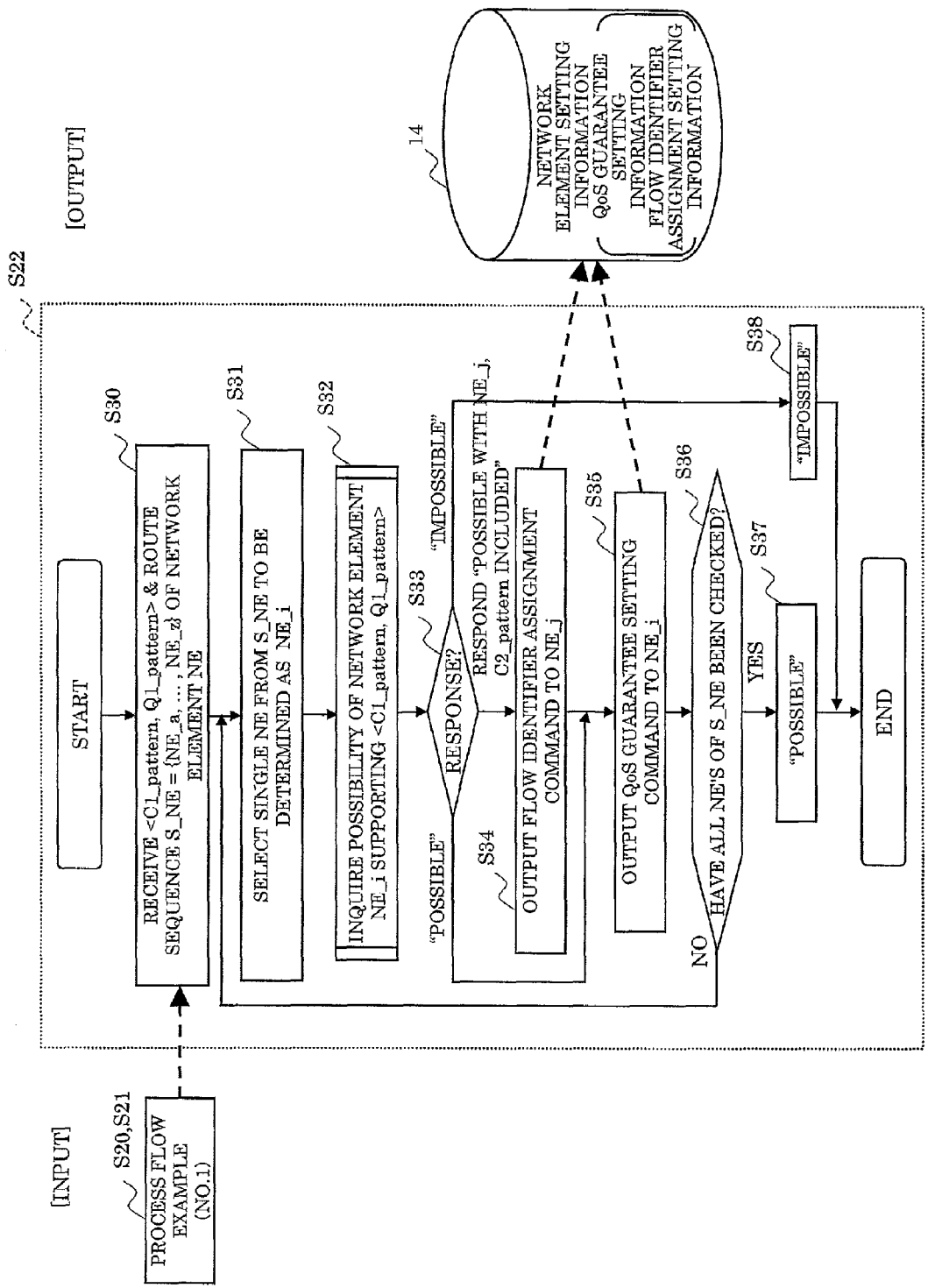
FIG. 6 is a flow chart showing an operation procedure example (No.2) of a QoS guarantee path route candidate retriever in a network management apparatus according to the present invention.
Figure 7:
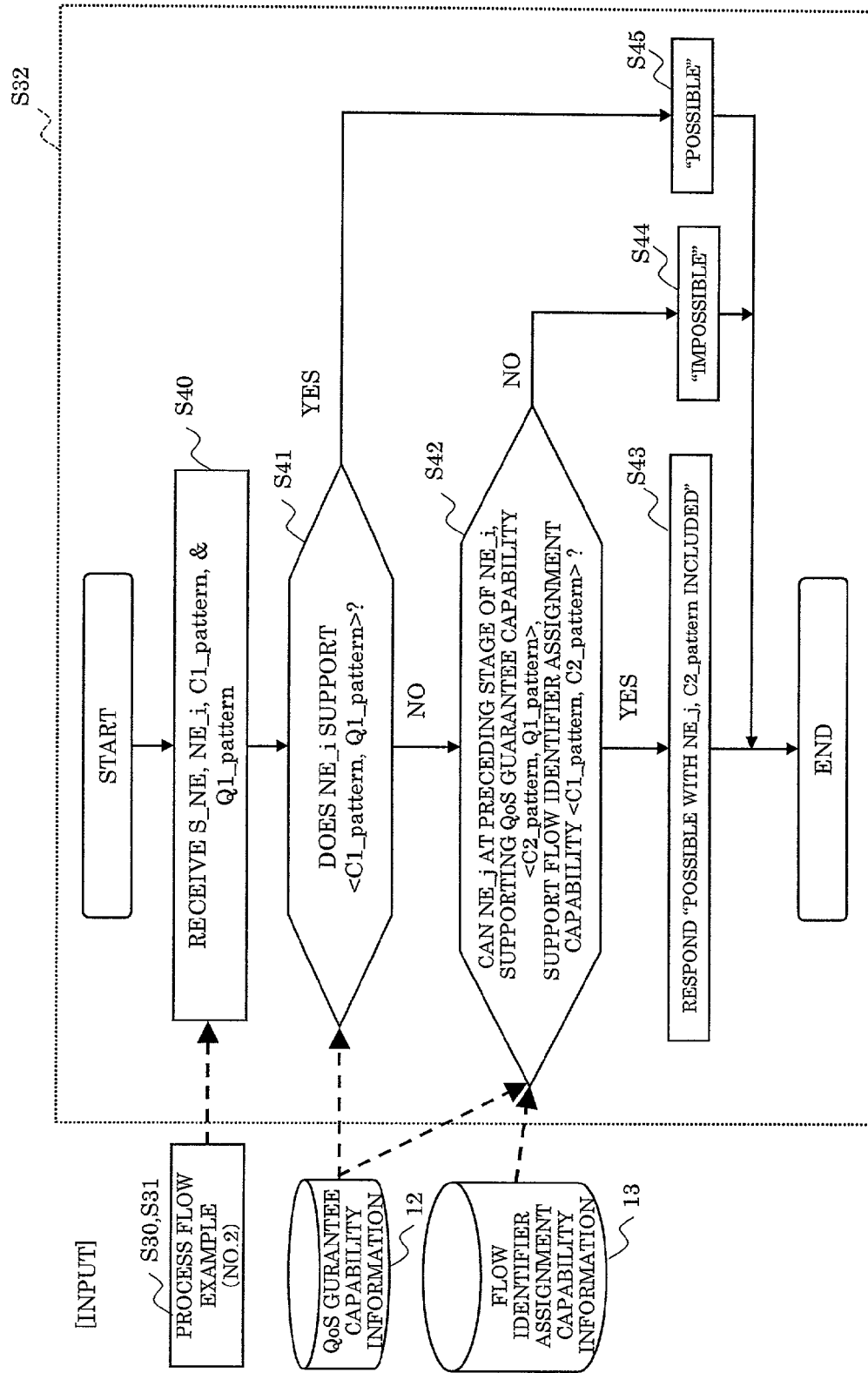
FIG. 7 is a flow chart showing an operation procedure example (No.3) of a QoS guarantee path route candidate retriever in a network management apparatus according to the present invention.

FIGS. 5–7 respectively show operation procedures (Nos.1–3) of the QoS guarantee path route candidate retriever 16. Steps S20–S25 of FIG. 5 show the operation procedure for retrieving the route candidate of the QoS guarantee path by the retriever 16. A subroutine called at step S22 is shown at steps S30–S38 in FIG. 6, which checks whether or not the QoS can be guaranteed in each network element.

Furthermore, a subroutine called at step S32 is shown in FIG. 7, which checks whether the network element can identify the flow and guarantee the QoS by itself or with the aid of a flow identifier assignment capability of another network element.

Hereinafter, the schematic operation of the retriever 16 will be described referring to FIGS. 5–7.

In FIG. 5, the retriever 16 receives the above-mentioned information from the accepting analyzer 15 (at step S20), and retrieves a single route sequence S_NE from the network element NE_a (20_1) to the network element NE_z (20_3) based on the network configuration information 11 (at step S21). Then, the retriever 16 inquires of the subroutine shown in FIG. 6 described later about the possibility of the sequence S_NE supporting the identifier pattern C1_pattern and the quality pattern Q1_pattern (at step S22).

In the presence of the supporting route at this time, the subroutine stores the QoS guarantee setting information (command) and the flow identifier assignment setting information (command) set in the network elements 20 on the route in the storage 18 as the network element setting information 14.

When the response from the subroutine is "possible", the retriever 16 ends the process (at step S23). When the response is "impossible", whether or not there is any other route is determined. In case of "No" (indicating there is no route), the failure of the QoS guarantee is notified to the terminal 70 (at steps S23–S25), and in case of "Yes" (when there is another route), the process returns to step S21, so that the route supporting the identifier pattern C1_pattern and the quality pattern Q1_pattern is retrieved (at steps S23, S24, S21, and S22).

The schematic operation of the retriever 16 in the subroutine called at the above-mentioned step S22 will now be described referring to FIG. 6.

The retriever 16 receives the identifier pattern C1_pattern, the quality pattern Q1_pattern, and the route sequence S_NE in the subroutine (at step S30), and inquires of the subroutine shown in FIG. 7 described later about the possibility of a single network element NE_i on the sequence S_NE supporting the identifier pattern C1_pattern and the quality pattern Q1_pattern (at steps S31 and S32).

When at least one network element 20 responds "impossible", the retriever 16 returns the response "impossible" to step S23 shown in FIG. 5 to end the process (at steps S33 and S38).

In case the response is "possible", the retriever 16 stores the command of setting the quality pattern Q1_pattern for the network element NE_i as the QoS guarantee setting information of the network element setting information 14 (at steps S33 and S35).

Also, in case the response is "possible with including NE_j, the identifier pattern C2_Pattern", i.e. in case the network element NE_j preceding the network element NE_i on the route can support <C1_pattern, Q1_pattern> if another flow identifier is assigned, the retriever 16 stores the commands of assigning the other flow identifier pattern C2_pattern to the network element NE_j and of setting the quality pattern Q1_pattern respectively as the flow identifier assignment setting information and the QoS guarantee setting information of the network element setting information 14 (at steps S33–S35).

The above-mentioned steps S31–S35 or steps S31–S33 and S35 are repeatedly executed to all of the network elements NE_a–NE_z on the route sequence S_NE (at step S36), and the response "possible" is returned to step S23 shown in FIG. 5 to end the process (at step S37).

Hereinafter, the subroutine called at step S32 will be described referring to FIG. 7.

In the subroutine, the retriever 16 receives the route sequence S_NE, the network element NE_i, the identifier pattern C1_pattern, and the quality pattern Q1_pattern (at step S40). When the network element NE_i supports <identifier pattern C1_pattern, quality pattern Q1_pattern>, the response "possible (can support)" is returned to step S33 shown in FIG. 6 to end the process (at steps S41 and S45).

In case of "impossible (can not support)", and of the network element NE_j at the preceding stage of the network element NE_i on the route sequence S_NE supporting the flow identifier assignment capability <identifier pattern C1_pattern, other identifier pattern C2_pattern>, and of the network element NE_i supporting QoS guarantee capability <identifier pattern C2_pattern, quality pattern Q1_pattern>, the retriever 16 responds "possible with including NE_j, identifier pattern C2_pattern" to step S33 (at steps S42 and S43), and otherwise the response "impossible" is returned (at steps S42 and S44).

(4) Specific Operation Example of QoS Guarantee Path Route Candidate Retriever 16

Figure 8:
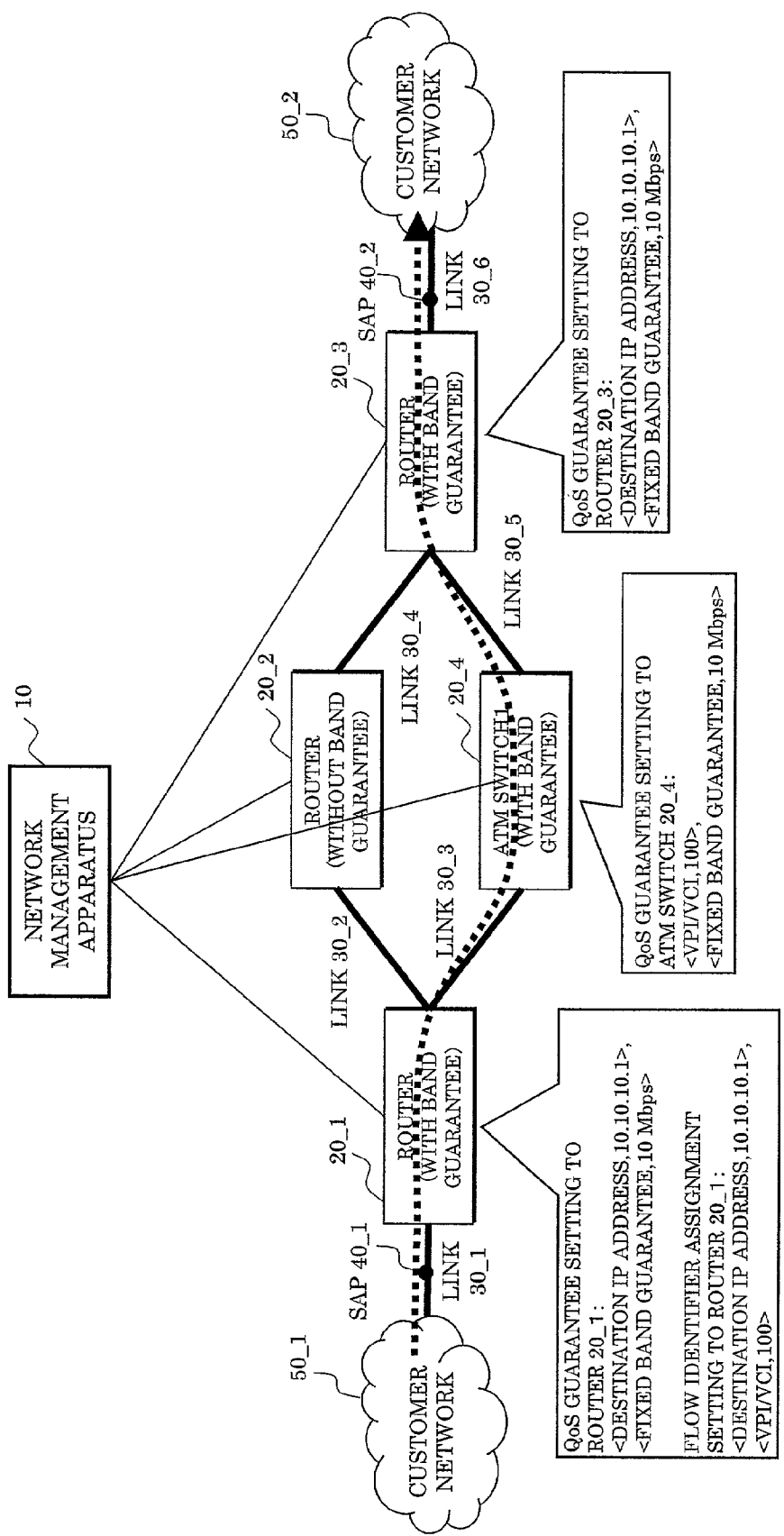
FIG. 8 is a block diagram showing a QoS guarantee setting example and a flow identifier assignment setting example set in a management object network element in an embodiment (1) of a network management apparatus according to the present invention.

FIG. 8 shows a route which the retriever 16 has retrieved based on the information received from the QoS guarantee request accepting analyzer 15 of FIG. 4, the QoS guarantee setting information (command), and the flow identifier assignment setting information (command) both set in the network element 20 on the route. The network element setting information 14 storing the QoS guarantee setting information and the flow identifier assignment setting information is shown in FIG. 3D.

Hereinafter, the operation when the retriever 16 determines the above-mentioned route and the network element setting information 14 will be described referring to FIGS. 9–14 which show the flows of FIGS. 5–7 corresponding to specific names of network elements and information.

Figure 9:
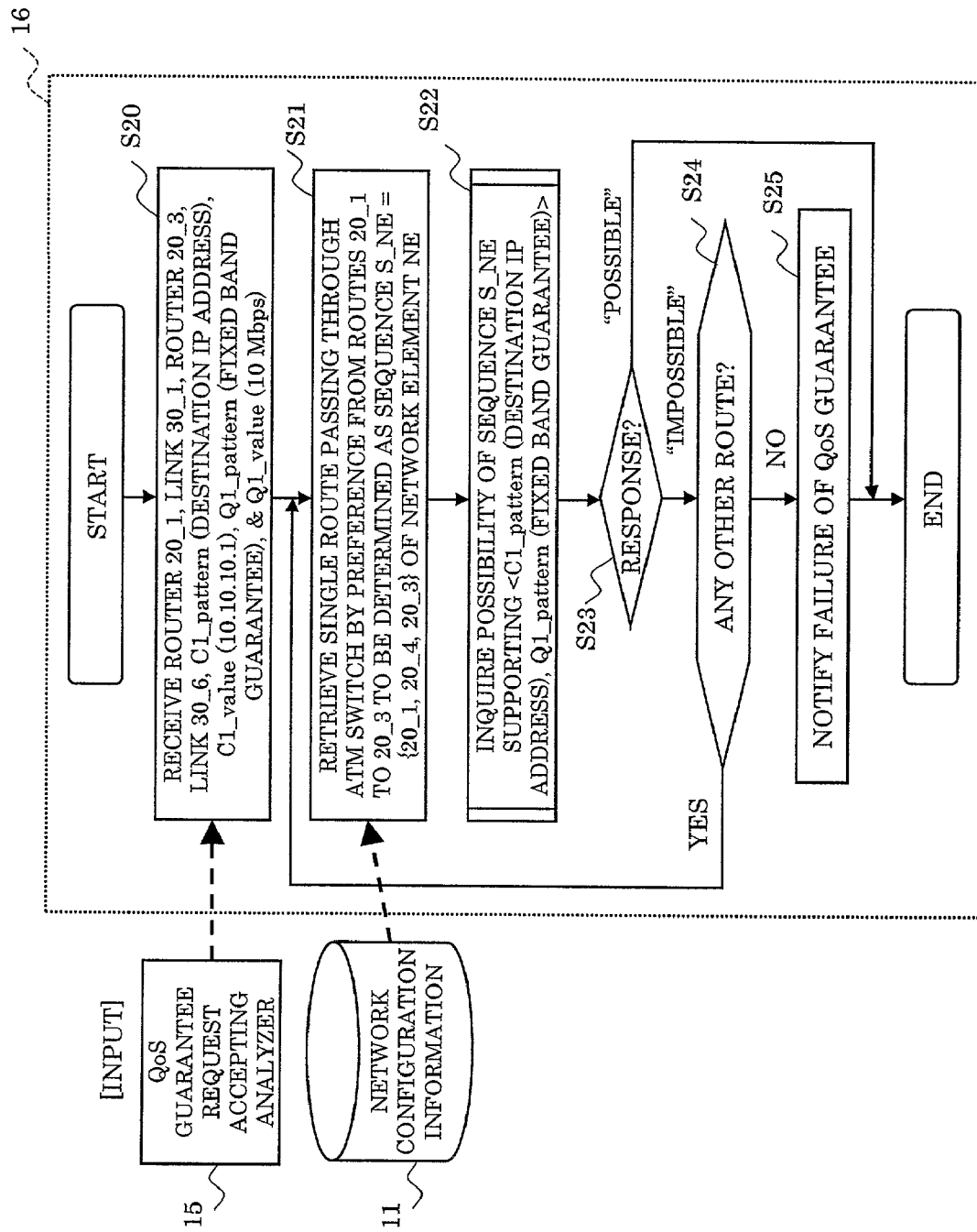
FIG. 9 is a flow chart showing an operation procedure (No.1) of a QoS guarantee path route candidate retriever in an embodiment (1) of a network management apparatus according to the present invention.

Step S20 in FIG. 9: The retriever 16 receives the routers 20_1, 20_3, the links 30_1, 30_6, the C1_pattern (destination IP address), the C1_value (10.10.10.1), the Q1_pattern (fixed band guarantee), and the Q1_value (10 Mbps) from the accepting analyzer 15.

Step S21: The retriever 16 retrieves a single route which passes through e.g. the ATM switch designated by the provider or the like from the routes from the router 20_1 to the router 20_3 referring to the network configuration information 11 (see FIG. 3A) to obtain the route sequence S_NE {20_1, 20_4, 20_3} (see route shown by thick lines in FIG. 8).

It is to be noted that when the route passing through the ATM switch is not designated, the retriever 16 sometimes retrieves the route sequence S_NE {20_1, 20_2, 20_3}. This will be described later.

Step S22: Possibility of the sequence S_NE {20_1, 20_4, 20_3} supporting <C1$_{13}$ pattern (destination IP address), Q1_pattern (fixed band guarantee)> is inquired.

Figure 10:
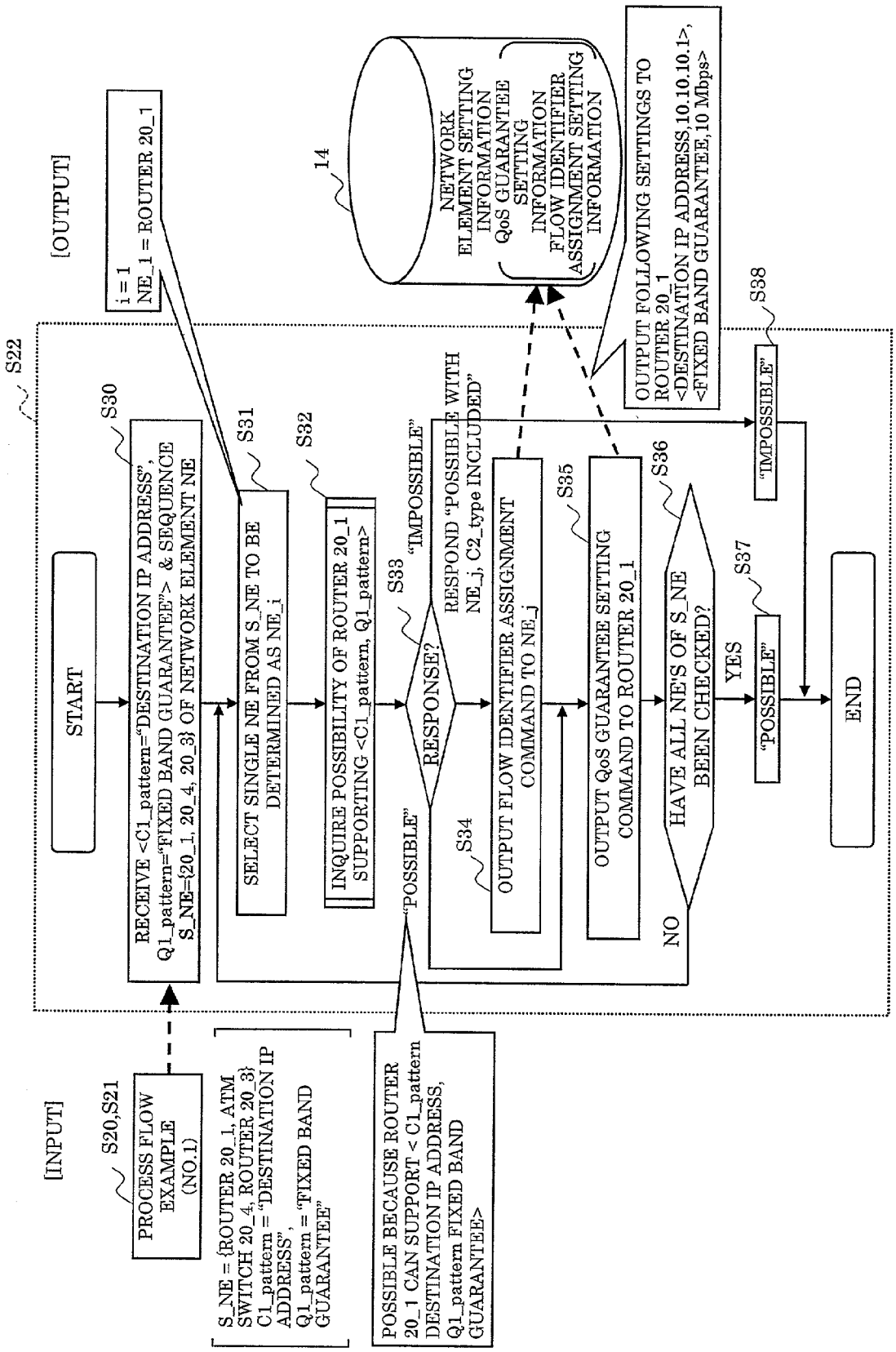
FIG. 10 is a flow chart showing an operation procedure (No.2) of a QoS guarantee path route candidate retriever in an embodiment (1) of a network management apparatus according to the present invention.

Step S30 in FIG. 10: The inquiry about the possibility of the sequence S_NE supporting <C1_pattern, Q1_pattern> is received.

Step S31: A single network element 20, e.g. the router 20_1 is selected among from the sequence S_NE.

Step S32: Possibility of the router 20_1 supporting <C1_pattern, Q1_pattern> is inquired.

Figure 11:
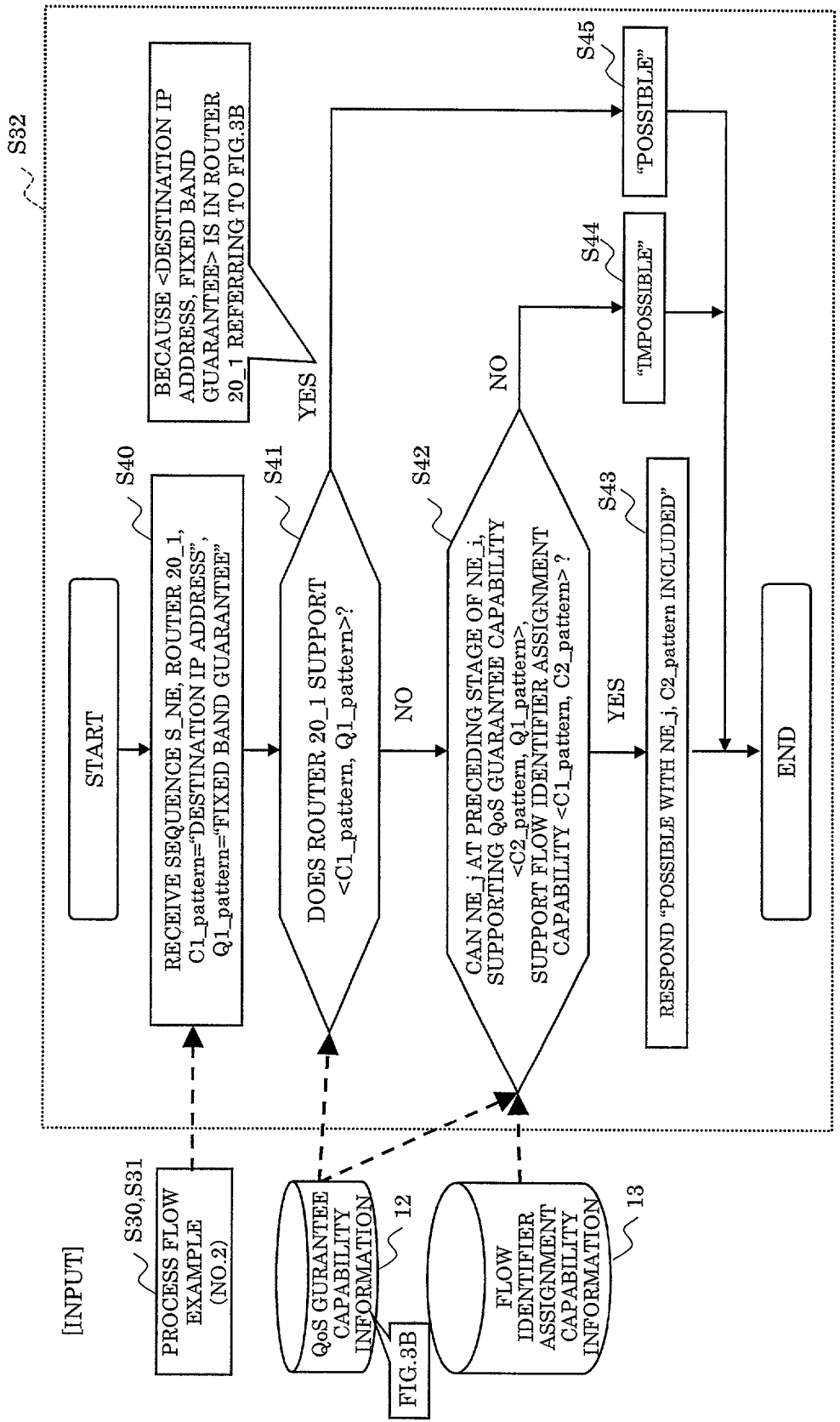
FIG. 11 is a flow chart showing an operation procedure (No.3) of a QoS guarantee path route candidate retriever in an embodiment (1) of a network management apparatus according to the present invention.

Step S40 in FIG. 11: Inquiry about the possibility of the router 20_1 on the sequence S_NE {20_1, 20_4, 20_3} supporting <C1_pattern (destination IP address), Q1_pattern (fixed band guarantee)> is received.

Step S41: Whether or not the router 20_1 supports <C1_pattern (destination IP address), Q1_pattern (fixed band guarantee)> is determined based on the QoS guarantee capability information 12 (see FIG. 3B). Since router 20_1 has a capability of guaranteeing <destination IP address, fixed band guarantee>, the response is "YES".

Step S45: The response "possible" is returned, and the process returns to step S32.

Steps S32 and S33 in FIG. 10: Since the response is "possible", the process proceeds to step S35.

Step S35: The QoS guarantee setting information (command) for the router 20_1<link 30_1, link 30_3, <destination address, 10.10.10.1>, <fixed band guarantee, 10 Mbps>> is stored in the QoS guarantee setting information of the network element setting information 14. The storing result is indicated in the QoS guarantee setting information of the router 20_1 in FIG. 3D.

Step S36: Since all of the network elements 20 in the sequence S_NE [20_1, 20_4, 20_3] are not checked, the process returns to step S31.

Figure 12:
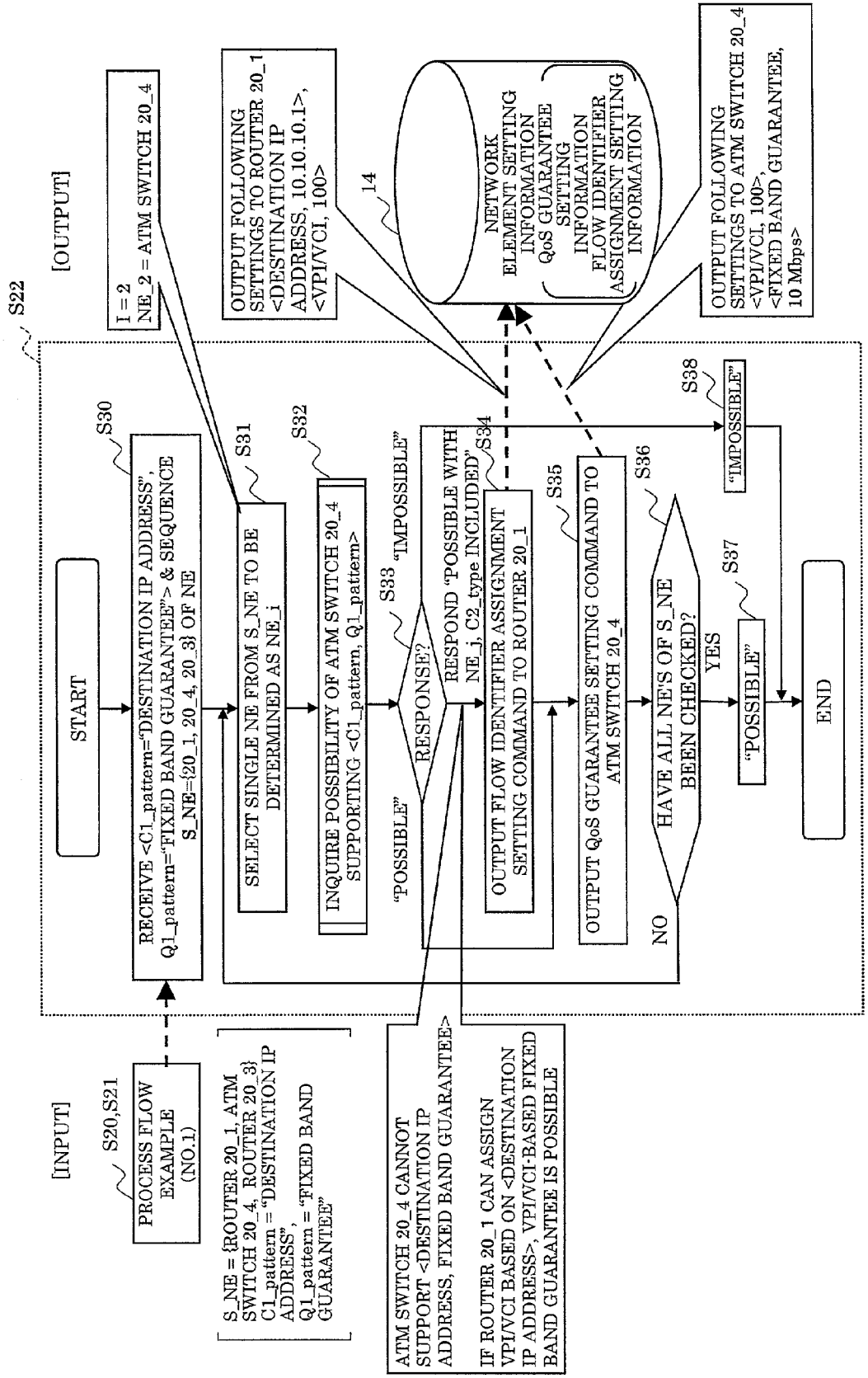
FIG. 12 is a flow chart showing an operation procedure (No.4) of a QoS guarantee path route candidate retriever in an embodiment (1) of a network management apparatus according to the present invention.

Steps S31 and S32 in FIG. 12: The ATM switch 20_4 is selected from among the sequence S_NE, and possibility of the ATM switch 20_4 supporting <C1_pattern, Q1_pattern> is inquired.

Figure 13:
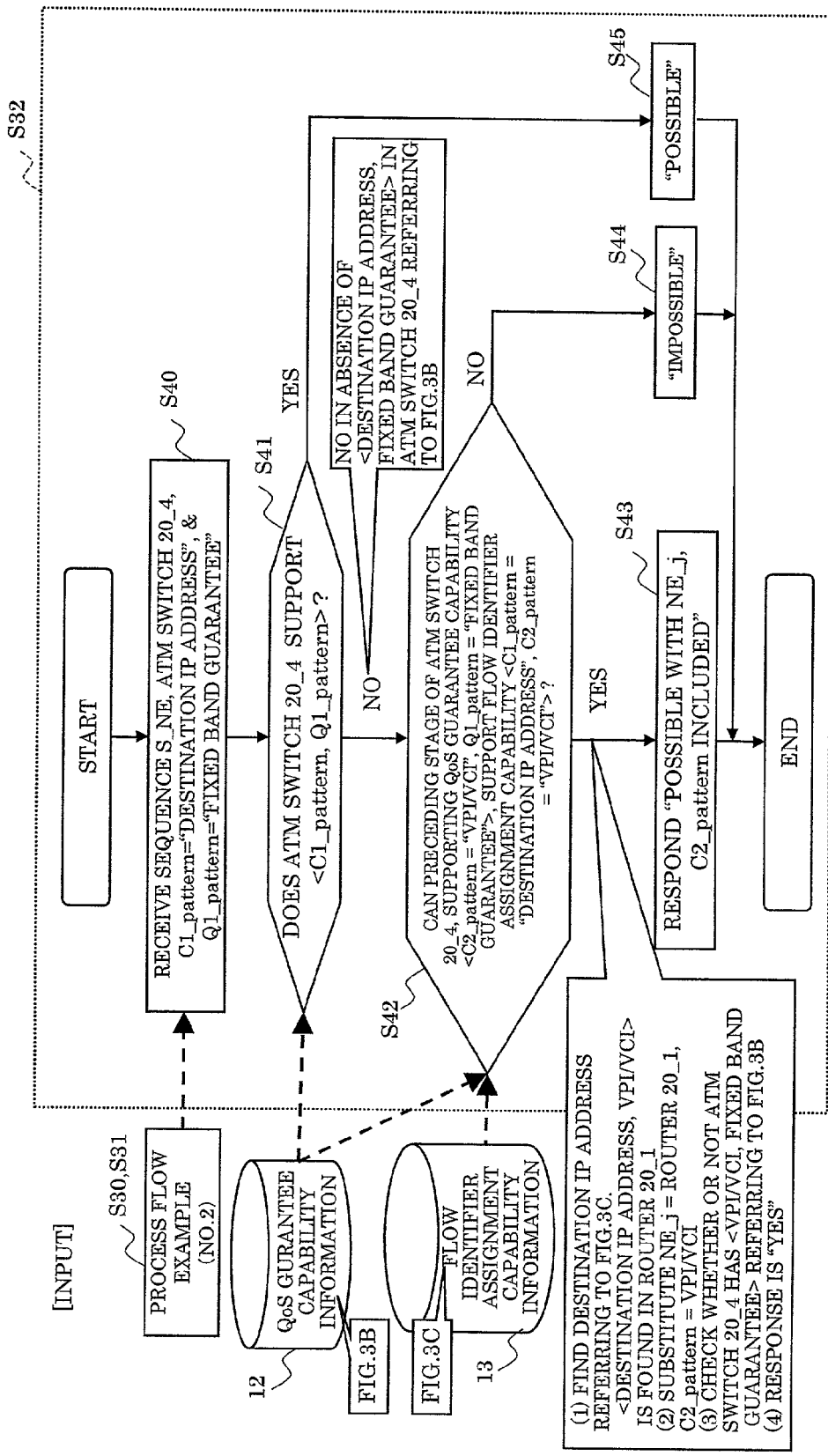
FIG. 13 is a flow chart showing an operation procedure (No.5) of a QoS guarantee path route candidate retriever in an embodiment (1) of a network management apparatus according to the present invention.

Step S40 in FIG. 13: The inquiry about the possibility of the ATM switch 20_4 of the sequence S_NE [20_1, 20_4, 20_3] supporting <C1_pattern (destination IP address), Q1_pattern (fixed band guarantee)> is received.

Step S41: Whether or not the ATM switch 20_4 supports <C1_pattern, Q1_pattern> is determined based on the QoS guarantee capability information 12. Since the ATM switch 20_4 does not support <C1_pattern (destination IP address), Q1_pattern (fixed band guarantee)> according to the QoS guarantee capability information 12 shown in FIG. 3B, the response is "NO".

Step S42: Since the ATM switch 20_4 guarantees the QoS guarantee capability <VPI/VCI, fixed band guarantee>, it is retrieved whether or not there is a network element, at the preceding stage of the ATM switch 20_4, supporting the flow identifier assignment capability <C1_pattern (destination IP address), C2_pattern (VPI/VCI)>, in which the ATM switch 20_4 supports the QoS guarantee capability <C2_pattern (VPI/VCI), Q1_pattern (fixed band guarantee)>.

Namely, it is confirmed by referring to the QoS guarantee capability information 12 of FIG. 3B that the ATM switch 20_4 has the QoS guarantee capability <VPI/VCI, fixed band guarantee>, so that the flow identifier assignment capability information 13 of FIG. 3C is retrieved to find the router 20_1 having the flow identifier assignment capability <destination IP address, VPI/VCI>. Therefore, "router 20_1" is made NE_J and "VPI/VCI" is made C2_pattern, which answers "YES".

Step S43: After the response "possible with including NE_j, C2_pattern" is provided, the process is ended, and returns to step S32 in FIG. 12.

Steps S32 and S33 in FIG. 12: In response to the response "possible with including NE_j, C2_pattern", the retriever 16 recognizes that the ATM switch 20_4 can not support <destination IP address, fixed band guarantee> but can guarantee a VPI/VCI based-fixed band if the flow identifier VPI/VCI based on the destination IP address is assigned by the router 20_1.

Steps S33 and S34: Therefore, the flow identifier assignment setting information command for the router 20_1<link 30_1, link 30_3, <destination IP address, 10.10.10.1>, <VPI/VCI, ANY>>, and the QoS guarantee setting information (command) for the ATM switch 20_4 <link 30_3, link 30_5, <VPI/VCI, ANY>, <fixed band guarantee, 10 Mbps>> are stored in the network element setting information 14 (see FIG. 3D).

Hereafter, the QoS guarantee setting information of the remaining router 20_3 in the sequence S_NE will be similarly determined as shown in FIG. 3D.

It is to be noted that when the route is not designated to path through the ATM switch 20_4 at step S21 in FIG. 9, the retriever 16 may retrieve the sequence S_NE [20_1, 20_2, 20_3] as a single route. In this case, the retriever 16 finds, referring to the QoS guarantee capability information 12 shown in FIG. 3B, that the router 20_2 can not guarantee the fixed band, and does not select the route sequence S_NE [20_1, 20_2, 20_3].

Also, even if it is shown in the QoS guarantee capability information 12 that the router 20_2 can guarantee the fixed band, the retriever 16 finds, by referring to the flow identifier assignment capability information 13, that the router 20_1 does not have the assignment capability of <destination IP address, DSCP>, and does not select the route sequence S_NE [20_1, 20_2, 20_3].

(5) Operation Example of QoS Guarantee Path Establishing Portion 17

The QoS guarantee path establishing portion 17 (see FIG. 1) performs the QoS guarantee setting and the flow identifier assignment setting of the network elements (router 20_1, ATM switch 20_4, and router 20_3) on the retrieved route based on the network element setting information 14 stored by the retriever 16 (see FIG. 8).

Figure 14:
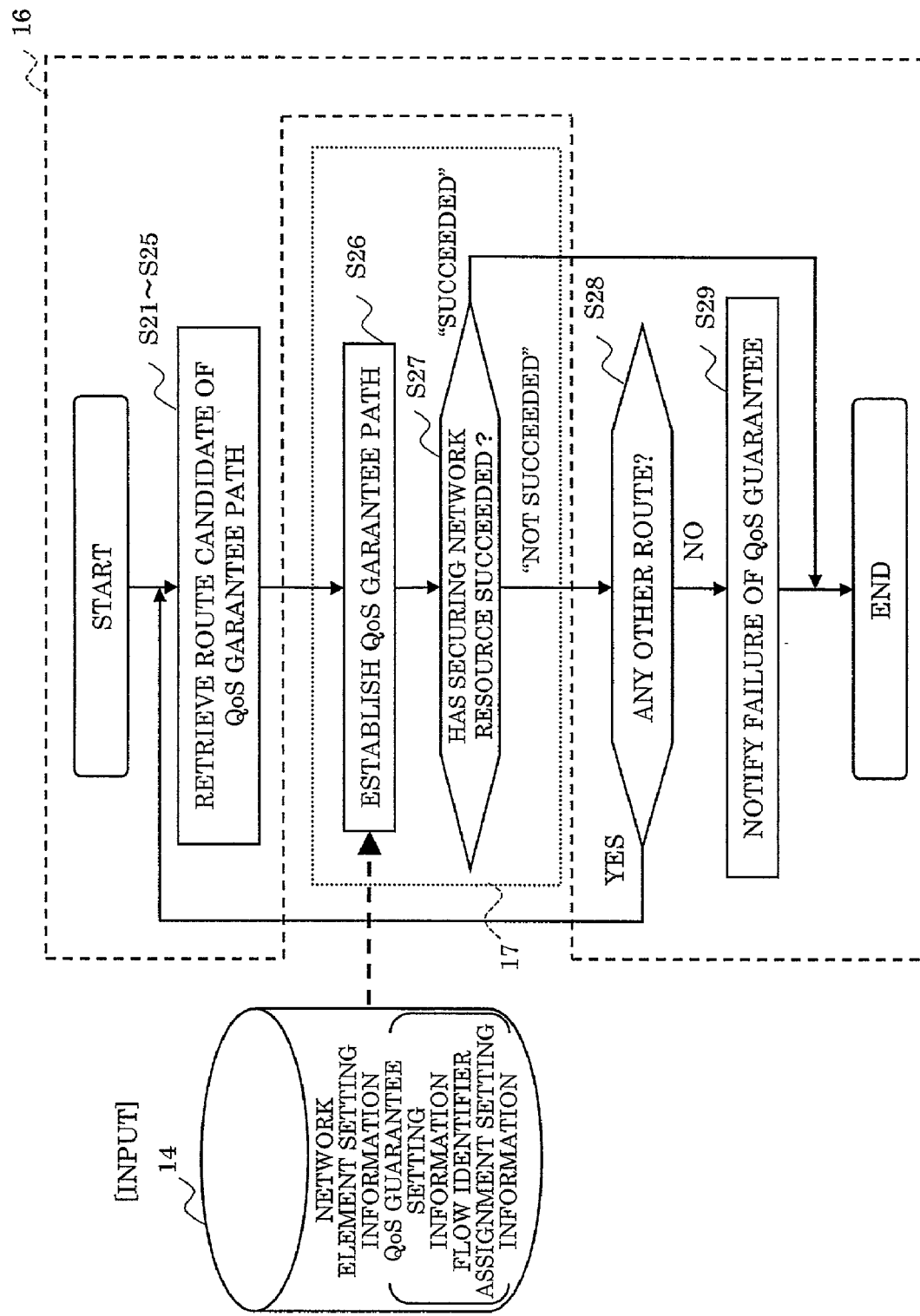
FIG. 14 is a flow chart showing an operation procedure of a QoS guarantee path establishing portion in an embodiment (1) of a network management apparatus according to the present invention.

FIG. 14 shows an operation when the QoS guarantee path establishing portion 17 fails in establishing the QoS guarantee path of a network resource securing type.

Steps S21–S25: The retriever 16 determines the QoS guarantee setting information and the flow identifier assignment setting information in the same way as steps S21–S25 shown in FIG. 9.

Steps S26–S28: The establishing portion 17 performs the setting of the network elements 20, so that the process is ended if securing resource is succeeded. If it is not the case and another path exists, the process returns to step S20 to repeat the same operation.

Step S29: In the absence of other paths, the failure of the QoS guarantee is notified to the terminal 70.

Figure 15:
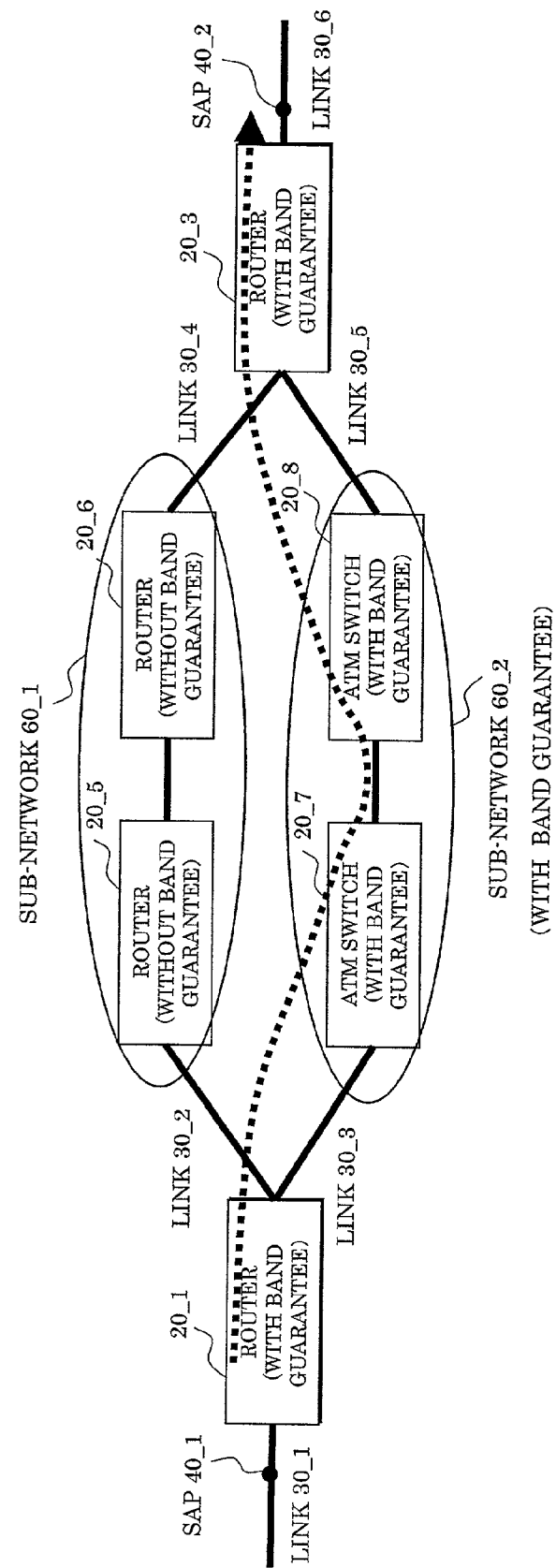
FIG. 15 is a block diagram showing an arrangement of a management object network in an embodiment (2) of a network management apparatus according to the present invention.

FIG. 15 shows an embodiment (2) of the present invention, in which a plurality of network elements 20 having the same QoS guarantee capability are preliminarily aggregated as a single sub-network. The QoS guarantee capability information 12 of this sub-network is stored in the storage 18, so that the QoS guarantee route is retrieved based on the QoS guarantee capability information 12 of the network elements and the sub-network when the QoS guarantee is accepted.

In FIG. 15, the routers 20_5 and 20_6 both without the band guarantee are aggregated as a single sub-network 60_1 without the band guarantee, so that the QoS guarantee capability information 12 of the sub-network 60_1 is stored in the storage 18. The routers 20_7 and 20_8 both with the band guarantee are aggregated as a single sub-network 60_2 with the band guarantee, so that the QoS guarantee capability information 12 of the sub-network 60_2 is stored in the storage 18.

Thus, it becomes possible to shorten a route retrieving time.

Figure 16:
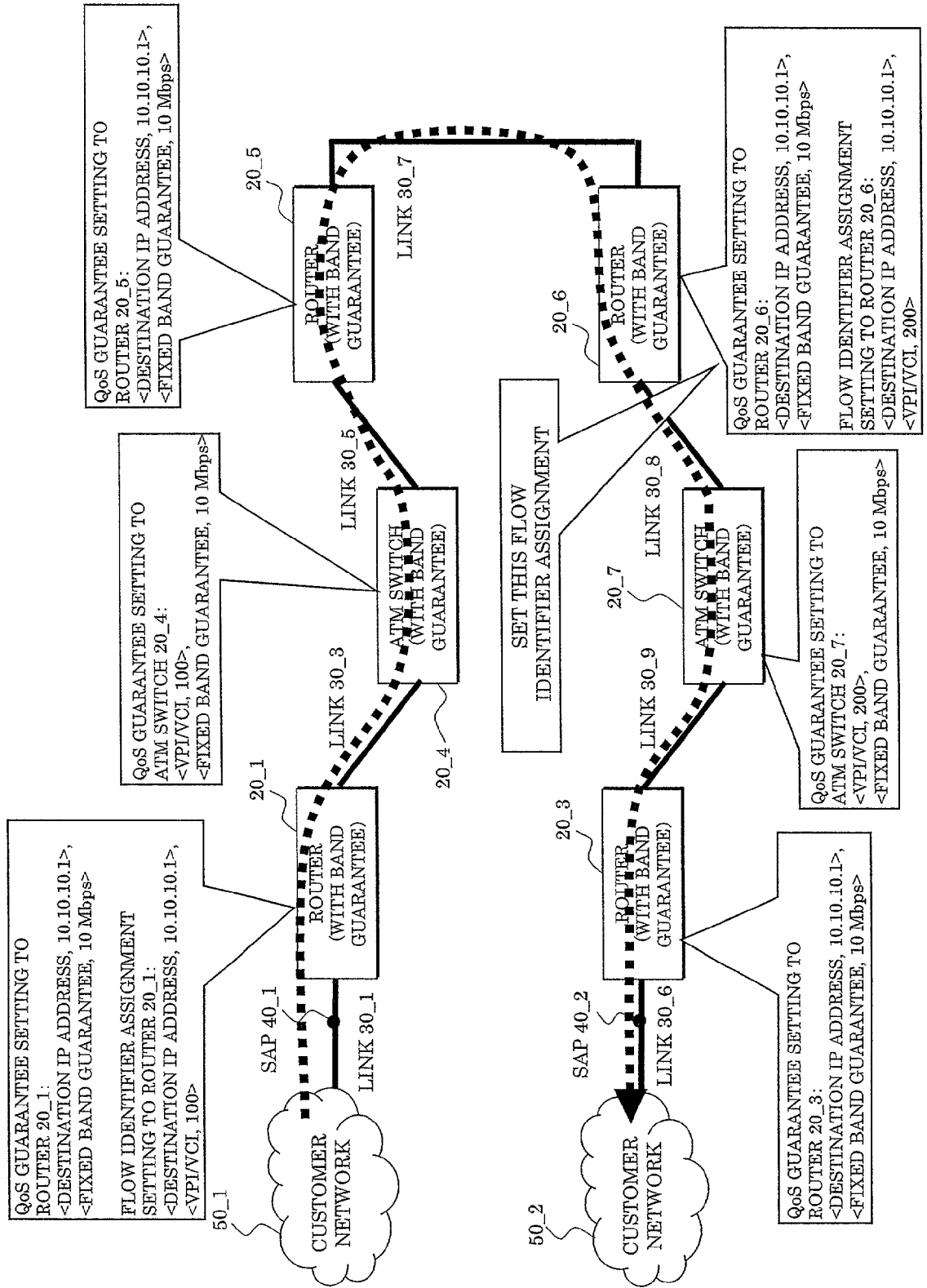
FIG. 16 is a block diagram showing an arrangement of a management object network in an embodiment (3) of a network management apparatus according to the present invention.

FIG. 16 shows an embodiment (3) of the present invention, in which the network management apparatus 10 has means (not shown) for specifying a network element in which a flow identifier vanishes (is deleted), and assigns the vanished flow identifier.

FIG. 16 shows a network where the routers 20_5 and 20_6, and the ATM switch 20_7 having the band guarantee are inserted between the ATM switch 20_4 and router 20_3 shown in FIG. 8 (router 20_2 is omitted).

If the flow identifier VPI/VCI vanishes in the routers 20_5 and 20_6, the route between the ATM switches 20_5 and 20_7 is not established, so that the retriever 16 can not retrieve the route (shown by the thick lines) from the router 20_1 to the router 20_3.

Therefore, the retriever 16 retrieves the routers 20_5 and 20_6 in which the flow identifier VPI/VCI on the route between the ATM switches 20_4 and 20_5 vanishes, confirms that the router 20_6 has a capability of assigning the flow identifier VPI/VCI, and then provides the assigning setting information of the flow identifier VPI/VCI to the router 20_6.

Thus, the router between the ATM switches 20_5 and 20_7 is established in the same way as the above-mentioned router 20_1 and the ATM switch 20_4, so that the route (shown by the thick lines) from the router 20_1 to the router 20_3 can be established.

FIG. 17 shows an embodiment (4) of the present invention, in which the configuration of the management object network is the same as the network shown in FIG. 8.

In this embodiment (4), the establishing portion 17 preliminarily establishes the path to the ATM switch 20_4, and stores the flow identifier VPI/VCI and the QoS guarantee setting information (both are not shown) of the path in the storage 18.

When the retriever 16 accepts the QoS guarantee request and the retrieved route sequence S_NE includes the ATM switch 20_4 to which a layer 2 path is established, the flow identifier assignment setting is performed so that the other router 20_1 may use the flow identifier VPI/VCI.

Thus, it becomes possible to perform the route retrieval and the QoS guarantee setting at a higher speed.

As described above, a network management apparatus according to the present invention is arranged such that a QoS guarantee path route candidate retriever retrieves a route enabling a predetermined QoS to be guaranteed or a route enabling the predetermined QoS to be guaranteed by being newly assigned with the flow identifier from among routes between a source and a destination network elements based on network configuration information, QoS guarantee capability information, and flow identifier assignment capability information, and a QoS guarantee path establishing portion performs a QoS guarantee setting and a flow identifier assignment setting to the network elements on the retrieved route. Therefore, it becomes possible to retrieve a QoS guarantee route at a high speed even in a network composed of network elements whose pattern such as a QoS guarantee and a flow identifier is different from each other, and to perform the QoS guarantee route setting of the network element on the route.

Also, the QoS guarantee path establishing portion determines a flow identifier value autonomously determined by the network element to which the QoS guarantee setting or the flow identifier assignment setting has been performed as an identifier value set in other network elements. Therefore, it becomes possible to select the network element which determines the flow identifier value as a network element on the QoS guarantee route Also, upon failing to establish a QoS guarantee path of a network resource securing type, the QoS guarantee path establishing portion establishes a next QoS guarantee path retrieved by the QoS guarantee path route candidate retriever, thereby enabling the QoS guarantee path of the network resource securing type to be secured from among a plurality of QoS guarantee routes.

Also, in the presence of a plurality of routes enabling the predetermined QoS to be guaranteed, the QoS guarantee path establishing portion selects a single route from among the routes according to a preliminarily designated selection method, thereby enabling a condition for designating the QoS guarantee route to be further set.

Also, the QoS guarantee capability information indicates a QoS guarantee capability of a sub-network composed of a plurality of network elements, and further a QoS guarantee capability of a sub-network composed of a plurality of network elements whose treatable flow identifiers are coincident with each other, thereby enabling the QoS guarantee route to be retrieved at a higher speed.

Also, as a route enabling the predetermined QoS to be guaranteed by being assigned with the flow identifier, a route without network element in which the flow identifier vanishes between a network element assigning the flow identifier and a network guaranteeing a QoS based on the flow identifier is retrieved, or a network element in which the flow identifier per classification of a flow identifier vanishes is specified, and a route to a network element having a capability to assign the vanished flow identifier is retrieved. Therefore, it becomes possible to determine the route based on the flow identifier assigned by the network element 20 at the preceding stage, or to establish the route including the network element 20 in which the flow identifier vanishes as the QoS guarantee route.

Furthermore, by establishing a layer 2 path having a preliminarily guaranteed QoS, it becomes possible to retrieve the route enabling the QoS to be guaranteed at a high speed.

Thus, according to the network management apparatus according to the present invention, a QoS guarantee process can be performed at a high speed. Also, this method is realized by an abstract information model independent of a technology. Therefore, even if a sub-network of new technology is added, an expansion can be easily performed.

What we claim is:

1. A network management apparatus comprising:
   a storage for storing network configuration information indicating a connection state of a plurality of network elements, QoS guarantee capability information indicating a QoS guarantee capability of the network elements, and flow identifier assignment capability information indicating a flow identifier assignable by the network elements;
   a QoS guarantee path route candidate retriever for retrieving a route enabling a predetermined QoS to be guaranteed or a route enabling the predetermined QoS to be guaranteed by being newly assigned with the flow identifier from among routes between a source and a destination network elements based on the network configuration information, the QoS guarantee capability information, and the flow identifier assignment capability information, and for preparing QoS guarantee setting information and predetermined flow identifier assignment setting information provided to the network elements on the retrieved route; and
   a QoS guarantee path establishing portion for performing the QoS guarantee setting and the flow identifier assignment setting to the network elements.

2. The network management apparatus as claimed in claim 1 wherein the storage further includes network element setting information of the network elements composed of the QoS guarantee setting information and the predetermined flow identifier assignment setting information prepared by the QoS guarantee path route candidate retriever; and the QoS guarantee path establishing portion performs, based on the network element setting information, the QoS guarantee setting and the flow identifier assignment setting of the network elements.

3. The network management apparatus as claimed in claim 1 wherein the QoS guarantee path establishing portion stores a flow identifier value determined by the network element to which either the QoS guarantee setting or the flow identifier assignment setting has been performed, and makes the flow identifier value an identifier value set in other network elements.

4. The network management apparatus as claimed in claim 1 wherein upon failing to establish a QoS guarantee path of a network resource securing type, the QoS guarantee path establishing portion establishes a next QoS guarantee path retrieved by the QoS guarantee path route candidate retriever.

5. The network management apparatus as claimed in claim 1 wherein in presence of a plurality of routes enabling the predetermined QoS to be guaranteed, the QoS guarantee path establishing portion selects a single route from among the routes according to a preliminarily designated selection method.

6. The network management apparatus as claimed in claim 1 wherein the QoS guarantee capability information further indicates a QoS guarantee capability of a sub-network composed of a plurality of network elements.

7. The network management apparatus as claimed in claim 6 wherein the QoS guarantee capability information further indicates a QoS guarantee capability of a sub-network composed of a plurality of network elements whose treatable flow identifiers are coincident with each other.

8. The network management apparatus as claimed in claim 6 wherein the sub-network comprises a network of other carriers.

9. The network management apparatus as claimed in claim 1 wherein the QoS guarantee path route candidate retriever retrieves, as a route enabling the predetermined QoS to be guaranteed by being assigned with the flow identifier, a route having no network element which deletes the flow identifier between a network element assigning the flow identifier and a network element guaranteeing a QoS based on the flow identifier.

10. The network management apparatus as claimed in claim 1 wherein the QoS guarantee path route candidate retriever specifies, as a route enabling the predetermined QoS to be guaranteed by being assigned with the flow identifier, a network element which deletes the flow identifier per classification of a flow identifier, and retrieves a route to a network element having a capability to assign the deleted flow identifier.

11. The network management apparatus as claimed in claim 1 wherein the QoS guarantee path establishing portion establishes one or more paths having a preliminarily guaranteed QoS to a network element, and stores QoS guarantee setting information and flow identifiers of the paths, thereby selecting a route enabling the QoS to be guaranteed, based on the QoS guarantee setting information, from among the paths when the predetermined QoS guarantee is requested, and setting another network element so that the flow identifier of the path is used.

* * * * *